(12) United States Patent
Colby et al.

(10) Patent No.: US 6,594,653 B2
(45) Date of Patent: Jul. 15, 2003

(54) SERVER INTEGRATED SYSTEM AND METHODS FOR PROCESSING PRECOMPUTED VIEWS

(75) Inventors: Latha S. Colby, Los Altos, CA (US); Richard L. Cole, Los Gatos, CA (US); Edward P. Haslam, San Francisco, CA (US); Nasi Jazayeri, Santa Clara, CA (US); Galt Johnson, Campbell, CA (US); William J. McKenna, Santa Cruz, CA (US); David G. Wilhite, Jr., Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/277,040

(22) Filed: Mar. 25, 1999

(65) Prior Publication Data

US 2002/0077997 A1 Jun. 20, 2002

Related U.S. Application Data

(63) Continuation of application No. 09/049,784, filed on Mar. 27, 1998.
(60) Provisional application No. 60/079,679, filed on Mar. 27, 1998, provisional application No. 60/079,670, filed on Mar. 27, 1998, and provisional application No. 60/079,671, filed on Mar. 27, 1998.

(51) Int. Cl.[7] .............................................. G06F 17/30
(52) U.S. Cl. .................... 707/3; 707/2; 707/4; 707/10; 707/102; 709/203
(58) Field of Search ............................. 707/1, 2, 3, 4, 707/10, 102; 345/348; 709/203

(56) References Cited

U.S. PATENT DOCUMENTS

| | | | |
|---|---|---|---|
| 5,220,625 A | 6/1993 | Hatakeyama et al. | 382/54 |
| 5,276,870 A | 1/1994 | Shan et al. | 395/600 |
| 5,515,488 A | 5/1996 | Hoppe et al. | 395/140 |
| 5,655,116 A | 8/1997 | Kirk et al. | 395/601 |
| 5,678,042 A | 10/1997 | Pisello et al. | 395/610 |
| 5,897,632 A * | 4/1999 | Dar et al. | 707/2 |
| 5,913,205 A * | 6/1999 | Jain et al. | 707/2 |
| 5,991,754 A * | 11/1999 | Raitto et al. | 707/2 |
| 5,995,961 A * | 11/1999 | Levy et al. | 707/4 |
| 6,006,216 A * | 12/1999 | Griffin et al. | 707/2 |
| 6,108,647 A * | 8/2000 | Poosala et al. | 707/1 |
| 6,269,359 B1 * | 7/2001 | Sekine | 707/2 |

* cited by examiner

Primary Examiner—Jean R. Homere
(74) Attorney, Agent, or Firm—Konrad Raynes Victor & Mann LLP

(57) ABSTRACT

Server-integrated methods and apparatus for processing precomputed views for answering user queries on a database are described. In accordance with one embodiment, a system for answering user queries on a database stored on a server includes a query processing system integrated into the server and configured to respond to user queries, and a query processing system integrated into the server and configured to process precomputed results of user queries on the database. In another aspect, a method of answering user queries on a database stored on a server includes responding to user queries received at the server, and processing, at the server, precomputed results of user queries on the database.

90 Claims, 10 Drawing Sheets

Product

| prod ID | product type | ... | bar code | ... |
|---|---|---|---|---|
| 1 | cereal x | · | | |
| 2 | toy y | · | | |
| 3 | paint z | · | | |

FIG. 1A

Sales

| time key | prod ID | Dollars | ... |
|---|---|---|---|
| 1/1/98-12:00 | 1 | 10 | |
| 1/1/98-12:01 | 1 | 13 | |
| 1/2/98-13:07 | 2 | 18 | |
| 1/2/98-14:02 | 3 | 7 | |

FIG. 1B

Time

| time key | day | month | year | ... |
|---|---|---|---|---|
| 1/1/98-12:00 | 1/1/98 | 1/98 | 98 | |
| 1/1/98-12:01 | 1/1/98 | 1/98 | 98 | |
| 1/1/98-12:02 | 1/1/98 | 1/98 | 98 | |
| ⋮ | ⋮ | ⋮ | ⋮ | |
| 2/1/98-12:00 | 2/1/98 | 2/98 | 98 | |
| 2/1/98-12:01 | 2/1/98 | 2/98 | 98 | |

FIG. 1C

Precomputed

| day | prod ID | sum_dollars |
|---|---|---|
| 1/1/98 | 1 | 23 |
| 1/2/98 | 2 | 18 |
| 1/2/98 | 3 | 7 |

FIG. 1D

SERVER INTEGRATED SYSTEM AND METHODS FOR PROCESSING PRECOMPUTED VIEWS

CROSS-REFERENCE TO RELATED APPLICATIONS

This application claims priority from the following co-pending applications, each of which is incorporated herein by reference: U.S. Provisional Application No. 60/079,679, filed Mar. 27, 1998, and entitled "System and Method for Answering a Database Query By Utilizing an Advisor;" U.S. Provisional Application No. 60/079,670, filed Mar. 27, 1998, and entitled "System and Method for Answering a Database Query By Utilizing Generated Candidate Views;" U.S. Provisional Application No. 60/079,671, filed Mar. 27, 1998, and entitled "System and Method for Answering a Database Query By Utilizing an Integrated Server;" and is a continuation of U.S. application Ser. No. 09/049,784, filed Mar. 27, 1998, and entitled "System and Method for Rewriting Relational Database Queries."

BACKGROUND OF THE INVENTION

This application relates to server integrated systems and methods for processing (including managing) precomputed views for responding to user queries on a database.

A database is a collection of data, usually pertaining to some reasonably well defined purpose. The data typically has a known format which is defined by metadata The data in a database is typically stored, retrieved, and modified by a database management system. A relational database management system stores information in tables, in rows and columns of data, and conducts searches. In a relational database, the rows of a table typically represent records (collections of information about separate items) and the columns typically represent fields (particular attributes of a record). A relational database management system may respond to user queries on the database by matching information from a field in one table with information in a corresponding field of another table, and producing a third table that combines data from both tables. For example, if one table contains the fields EMPLOYEE-ID, LAST-NAME, FIRST-NAME, DEPT-ID, SALARY and HIRE-DATE, and another table contains the fields DEPT-ID, DEPT-NAME, and LOCATION, a relational database management system may match the DEPT-ID fields in the two tables to find the names of all employees working in a department in a specified location.

Users typically query, update and manage a relational data base using a data sublanguage (e.g., SQL). A data sublanguage is one that may be used in association with another computer language for the specialized purpose of accessing data. There are many relational data sublanguages, including QUEL from Relational Technology, Inc. (ASK/Ingres), and RDML from Digital Equipment Corporation. SQL has been formally standardized for access to relational databases and is widely implemented and used, although there are many variations of SQL (e.g., RISQL™ from Informix Software, Inc. of Menlo Park, Calif.).

In the relational database model, the basic unit of data is the relation. In SQL, the relation is represented by a table. A relation is typically made up of one or more attributes (represented as columns in SQL), each of which is associated with a data type (e.g., a character string, an integer, or a floating point number). Data typically is stored in a table in tuples (rows in SQL).

Referring to FIGS. 1A–1D, the relational database tables Product, Sales, Time and Result contain columns of attributes and rows of data related to those attributes. For example, the Product table of FIG. 1A, includes prod ID, product type, and bar code. Specific operations can be performed on these tables. One such operation is selection, which identifies a specific row or rows in a table. Selection is typically done by specifying one or more predicates that are used to filter a table to identify rows for which the predicate is true. Predicates are typically found in the WHERE clause of an SQL query. For example, a selection operation could request the selection of prod ID of 1, which would select the first row of the Product table. Another operation in the relational database model is called the join. A join operation is a way of combining data from two tables which is typically based on the relationships between the data in those tables. The Product table identifies the product type by prod ID, and the Sales table identifies the amount of dollars associated with each prod ID/time (time key) combination. The Product table and the Sales table may be joined through their prod ID columns. The Sales table also associates a time key with each row, and the Time table relates a day with each time key. Accordingly, the Sales table and the Time table may be joined through the time key values.

FIG. 2 shows relationships between a fact table and its dimension tables. Fact tables and dimension tables are a subset of detail tables. Fact tables are detail tables which record events (e.g., a sales event). The tables in which information related to the sales event (e.g., a time, a store, and a product) is stored are the dimension tables of the associated fact table. For example, Time table, Store table, and Product table are the dimension tables associated with the Sales table. The Class outboard (dimension of a dimension) table eliminates redundancies by repeated information (the relationships between products and classes) in a separate table. This feature is referred to as normalization.

Another concept in relational database models is functional dependency. A functional dependency is a many-to-one relationship between columns of values in database tables. A functional dependency from column x to column y is a constraint that requires two rows to have the same value for the y column if they have the same value for the x column. A functional dependency may be explicitly declared by a user, such as the database administrator.

Further, relational database models provide for an aggregation query, which is a query that requires the summarization or consolidation of rows in database tables, typically using a set function, such as SUM or COUNT, and an optional GROUP BY clause. An aggregate table is typically a table that summarizes or consolidates detail level records from other database tables.

SQL enables users to define a virtual table (a "view") and to save that definition in a database as metadata. A view usually is not physically materialized (or "precomputed") until it is needed (e.g., when a SQL statement references the view). The metadata about the view can include information such as the name of the view, the names and data types of each column and the SQL text describing the data the view produces. The metadata about the view is typically stored in the database's metadata, but the actual data that the user will see in the view are typically not physically stored. Rather the data typically are stored in detail tables from which the view's rows are derived. In the case of a precomputed view, data typically is stored in an associated precomputed table. In general, operations can be performed against views just as they can be performed against detail tables.

A user may request information such as how many units of cereal X were sold on Jan. 1, 1999. The result of that query may be derived from the Product table (FIG. 1A), the Sales table (FIG. 1B), and the Time table (FIG. 1C). However, deriving the answers to each question from various tables can be highly inefficient and time consuming. In order to increase efficiency, a database administrator may predict questions which are most likely to be asked and precompute a table which includes the answers to these likely questions prior to these questions actually being asked. For example, a store's database administrator may determine that a frequently asked question is the total sum of sales of a given product over a period of one day (sum_dollars). Accordingly, the database administrator may create the Precomputed table (FIG. 1D) and a precomputed view associated with that table.

The database administrator typically can not be expected to anticipate all common questions likely to be asked and even if all queries were known it is not feasible to precompute/materialize all results. When a query is asked and the answer is not directly available from a precomputed table, the answer to such a query typically is derived from one or more detail tables, a process which may be highly time consuming and computationally intensive.

SUMMARY OF THE INVENTION

The invention features server-integrated methods and apparatus for processing precomputed views for answering user queries on a database.

In accordance with one aspect, the invention features a system for answering user queries on a database stored on a server, comprising: a query processing system integrated into the server and configured to respond to user queries; and a query processing system integrated into the server and configured to process precomputed results of user queries on the database.

Embodiments may include one or more of the following features.

The query processing system may be configured to compute precomputed views. The query processing system may be configured to update precomputed views to reflect changes in the database. The query processing system may be configured to manage precomputed views. The query processing system may include a rewriter configured to rewrite user queries using precomputed views. The query processing system may be configured to provide information to users relating to precomputed views and user query history.

The query processing system may include an advisor configured to analyze precomputation strategy effectiveness. The advisor may be configured to generate a report reflecting current precomputation strategy effectiveness. The generated report may include a measure of the benefit of a precomputed view relative to other precomputed views. The generated report may include a measure of the benefit of a precomputed view relative to candidate views. The advisor may be configured to generate a report reflecting precomputed view utilization.

The query processing system may be configured to define an analysis space consisting of a subset of all possible views for the database based upon user query history. The query processing system may be configured to generate a candidate view. The query processing system is configured to utilize database meta data (e.g., functional dependencies).

In another aspect, the invention features a method of answering user queries on a database stored on a server, comprising: responding to user queries received at the server; and processing, at the server, precomputed results of user queries on the database.

Embodiments may include one or more of the following features.

Precomputed views may be computed at the server. Precomputed views may be updated at the server to reflect changes in the database. Precomputed views may be managed at the server. User queries may be rewritten at the server using precomputed views. Information relating to precomputed views and user query history may be provided to users from the server.

Precomputation strategy effectiveness may be analyzed at the server. A report reflecting current precomputation strategy effectiveness may be generated at the server. The generated report may include a measure of the benefit of a precomputed view relative to other precomputed views. The measure may reflect the benefit of a precomputed view relative to candidate views. A report reflecting precomputed view utilization may be generated at the server.

An analysis space consisting of a subset of all possible views for the database based upon user query history may be defined at the server. A candidate view may be generated at the server. Database meta data (e.g., functional dependencies) may be utilized at the server.

Among the advantages of the invention are the following.

Aggregation information is stored in the system tables along with all the other metadata for the database, making knowledge of all database activity centralized. The result of this integration is consistency and the ability to use the enhanced meta data for query compilation and optimization regardless of whether precomputed views are used. For example, if aggregate table data is out of synch with detail data, the system knows about it instantly and does not use the table to rewrite queries (unless requested to do so). In addition, optimization strategies are known to the query processing system as a result of full integration. Server integration enables precomputed tables to be automatically maintained. This feature also enables users to access advisory features and meta data information using an SQL interface. This features also allows the advisory facility to use the query processing capabilities located at the server, and allows front end tools to use the capabilities of the precomputed view processing system. In accordance with one aspect of the invention, precomputed data is stored in tables that allow the definition of relationships between precomputed results and detail data (e.g., foreign key relationships). Server integration also allows the query processing system to access the logical and physical database design options that are provided by the database server.

Other features and advantages will become apparent from the following description, including the drawings and the claims.

BRIEF DESCRIPTION OF THE DRAWINGS

FIGS. 1A–1D are diagrammatic views of a Product table, a Sales table, a Time table and a Precomputed table, respectively.

DETAILED DESCRIPTION

I. Overview

A. General Features of a System and Method of Managing Precomputed Views

Figure 2:
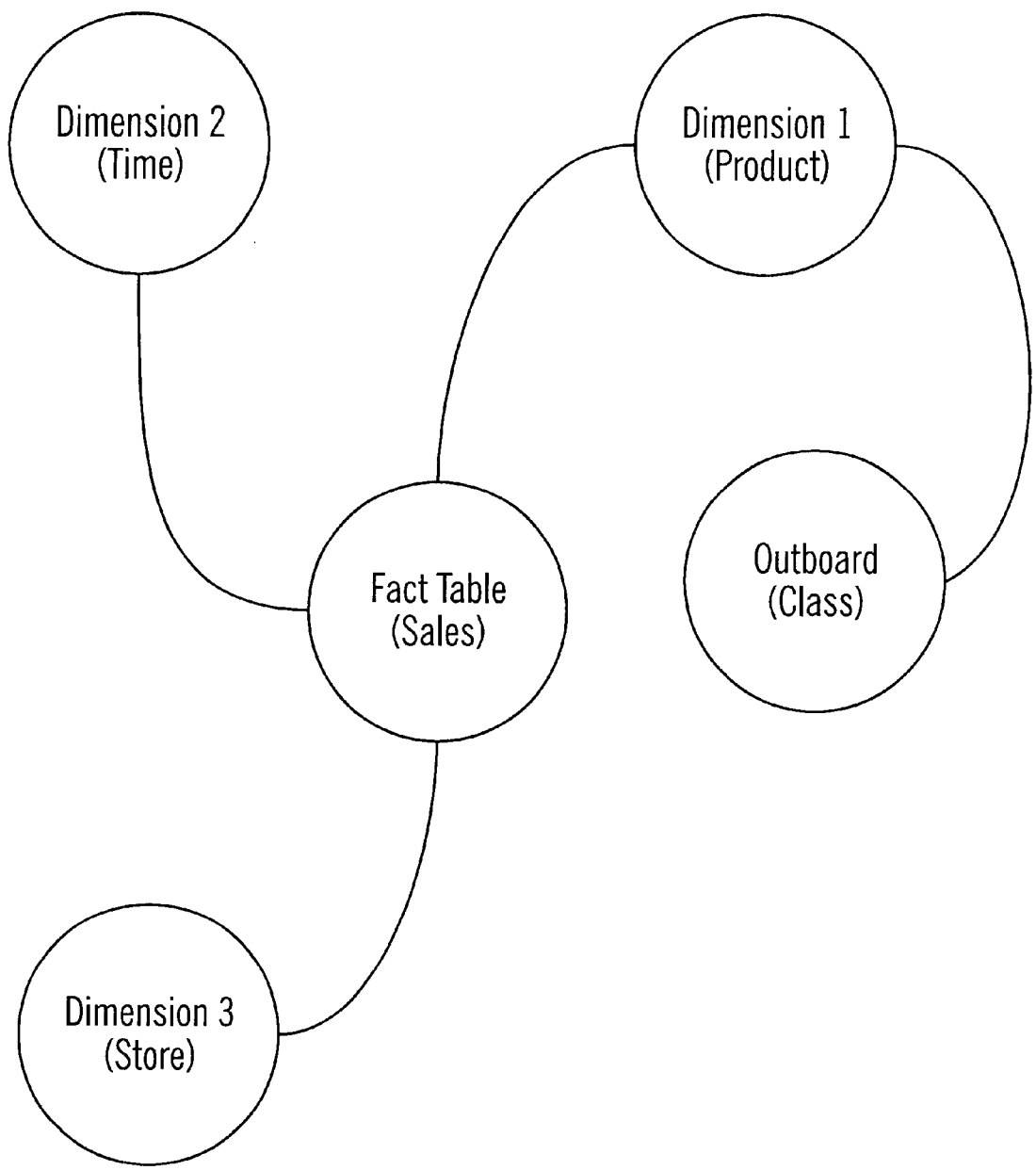
FIG. 2 is a diagrammatic view of a Fact table and its associated dimensions.
Figure 3:
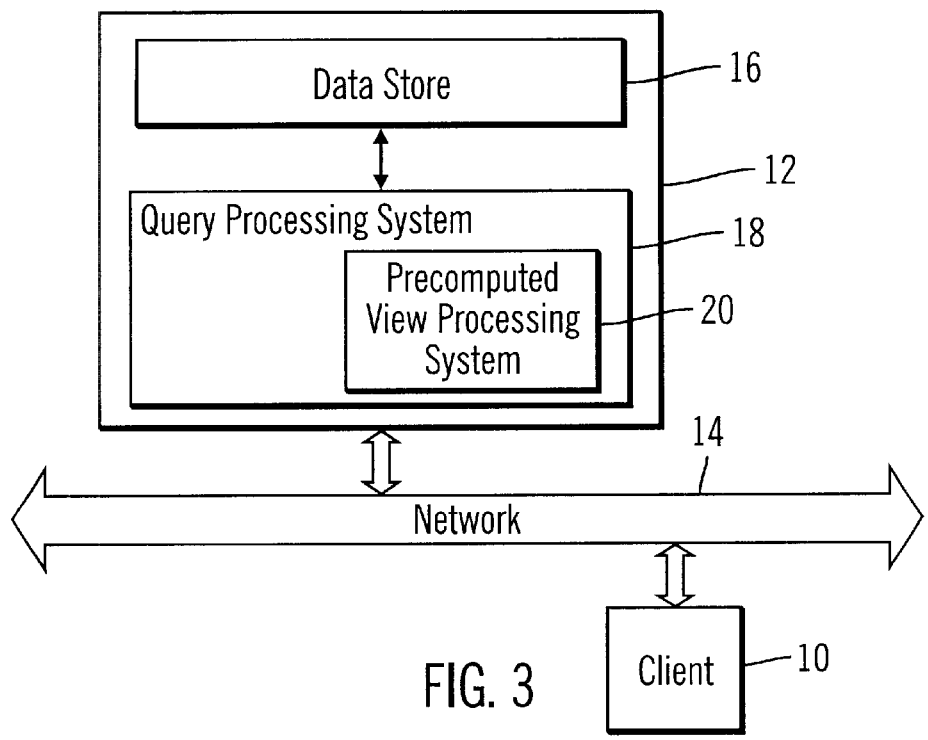
FIG. 3 is a diagrammatic view of a client coupled to a database server over a network.

Referring to FIG. 3, in one embodiment, a client 10 may send queries to a database server 12 over a network 14 to access data contained in a data store 16 (e.g., a data warehouse such as the Red Brick Warehouse available from Informix Software, Inc. of Menlo Park, Calif.). Database server 12 includes a query processing system 18 which, in turn, includes a precomputed view processing system 20. Query processing system 18 receives queries from client 10 over network 14 and, with the support of precomputed view processing system 20, executes the received queries by returning to client 10 data from data store 16 that corresponds to the requested information. Precomputed view processing system 20 provides a systematic approach to precomputing aggregate data for decision-support queries. Before each query is executed, precomputed view processing system 20 performs a cost-based analysis to determine whether the query should be intercepted and rewritten to improve query performance. In addition, precomputed view processing system 20 logs statistics about query execution to enable database administrators to determine how efficiently the existing aggregation strategy is working and to determine how to improve the current aggregation strategy.

In decision support environments, a standard model of data is that of facts associated with points in a dimension space. In a retailing environment, for example, each sale occurs at a particular time, in a particular store, and is of a particular product. In this example, each sales event is a fact and occurs at a point in the three-dimensional space (product, store, time). Each dimension usually forms a hierarchy: product may be a two-level hierarchy, for example, with product-type at the finest level of granularity and product-category at the coarsest level. Multi-dimensional data models distinguish between points in dimensions (e.g., product-type) and attributes of these points (e.g., product-color). Aggregates typically are computed on points in the dimension space, possibly with constraints placed on dimensional attributes.

Aggregate processing in relational databases typically involves retrieving qualifying fact records based upon dimensional constraints, grouping the records by values for points in specified dimensions, and applying aggregate functions to each group. Even with a highly efficient query processing system, aggregate queries requiring billions of fact and associated dimension records often will be very expensive to compute. Precomputation often results in dramatic performance gains in aggregate processing, and aggregate results at one level of granularity often can be used to compute (rollup) aggregates at coarser granularities. This eliminates the need to precompute all possible aggregates.

As explained in detail below, precomputed view processing system 20 includes a query rewrite system (the Rewriter), a query logging and analysis facility (the Advisor), and an enhanced meta data facility (the Meta Data Layer). The Rewriter intercepts and attempts to rewrite user database queries using aggregate tables; the Rewriter rewrites queries transparently to client applications and end users. The Advisor may be queried for advice on the size and relative benefits of existing aggregate tables and potential (candidate) aggregate tables that would be useful to create. The Meta Data Layer stores information about database objects and their relationships.

B. Database Objects

Figure 4:
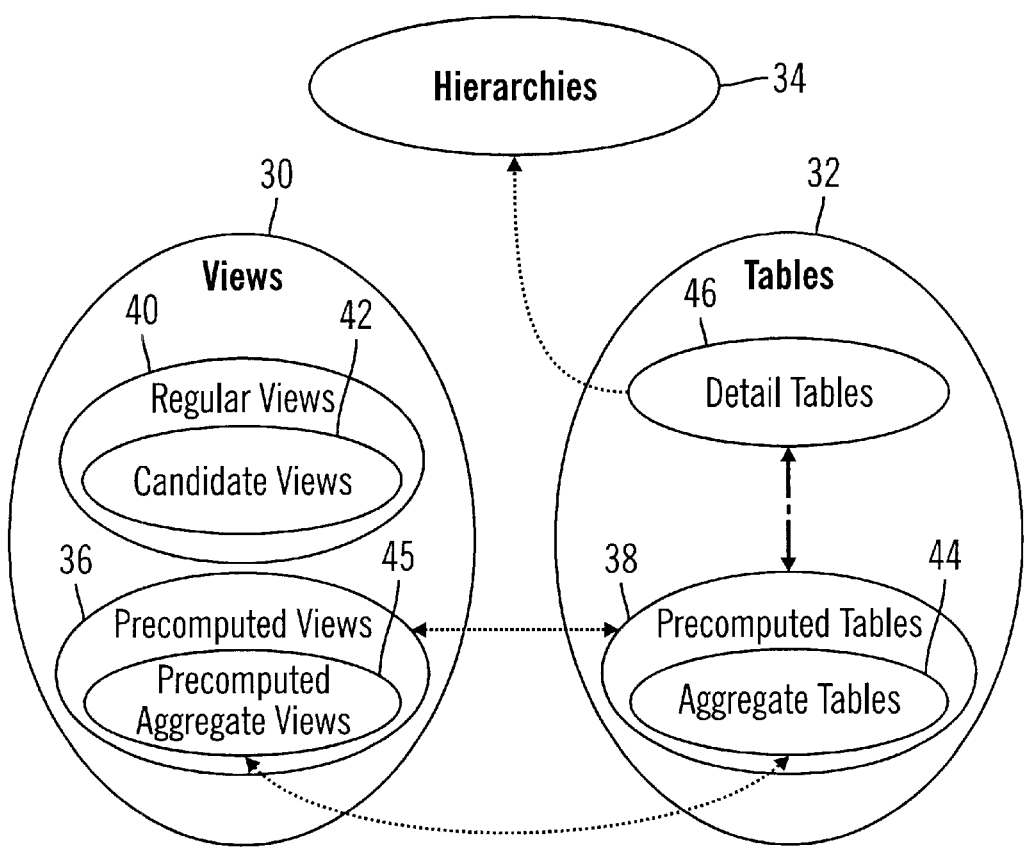
FIG. 4 is a diagrammatic view of the relationships between views, tables and hierarchies.

FIG. 4 illustrates the relationships between views 30, database tables 32 and hierarchies 34. In general, a view 30 defines a client query on data store 16. A precomputed view 36 defines a query and is linked to a precomputed table 38, which is a database table that contains the precomputed results of the query. In other words, a query defined in a precomputed view is computed before the query is received by query processing system 18. In contrast, the results for a query defined by a regular view 40, including candidate views 42 which are generated by the Advisor, must be computed every time the regular view is referenced. In operation, a query defined in a precomputed view 36 may be precomputed automatically; otherwise, the database administrator must populate the associated precomputed table 38. The database administrator may populate the table using, for example, a Table Management Utility (TMU) LOAD DATA operation or an SQL "INSERT INTO . . . SELECT" statement. The administrator may then create an associated precomputed view 36 that contains a query expression which reflects the contents of the precomputed table 38. Once defined, query processing system 18 may automatically update precomputed tables 38 to reflect changes in detail tables 46 and may also rewrite user queries to use precomputed views (and their associated precomputed tables).

An aggregate table 44 is a precomputed table that stores the results of an "aggregate query" defined in an associated precomputed aggregate view 45, which defines the aggregate relationship between the aggregate table and an underlying set of detail tables 46. The precomputed view definition establishes the semantic link between detail tables 46 and the aggregate table 44 containing the precomputed results. In general, aggregate tables 44 contain information that has a coarser granularity (i.e., fewer rows) than the information contained in detail tables 46. For example, in a retail database, the transaction-level data might be in the form of individual sales receipts stored in a Sales_Receipts detail table. The records in the Sales_Receipts table may be aggregated over certain time periods to produce a set of aggregate tables (e.g., a Sales_Daily table and a Sales_Monthly table).

An aggregate query typically uses a standard SQL function, such as SUM or COUNT, to aggregate factual data (e.g., sales totals over given periods of time) contained in detail tables 46. Other aggregation queries use a GROUP BY clause to select distinct rows of dimension data from a large dimension table (e.g., distinct combinations of quarters and years or districts and regions). In these ways, aggregation queries "roll up" rows of data of fine granularity into groups of rows of coarser granularity. The performance gain offered by the query rewrite system derives from the precomputation of these rollups. Additional performance gains are achieved by the ability of the query rewrite system to rewrite queries that require additional rollups, involving columns of a granularity that is coarser than the grouping columns of the view. In other words, the query rewrite system may be used to rewrite a large number of queries that do not match the query defined in the view. For example, the view might define a query that returns rows grouped by a Month column, yet this view may be used to rewrite queries grouped by the Qtr and Year columns, despite the fact that neither of these columns is named in the query defined by the view. This rollup capability frees a database administrator from having to create three separate views, grouped by Month, Qtr and Year, respectively, or one very wide view grouped by all three columns.

Hierarchies 34 (i.e., functional dependencies), which are inherent in warehouse data, enable rollups to columns which are not defined in precomputed views. A hierarchy is a many-to-one relationship shared by columns of values. In other words, a hierarchy from column X to column Y is a constraint that requires two rows to have the same value for the Y column if they have the same value for the X column. The columns may be in the same table or in different tables. For example, if a hierarchy exists between the Store_Number and City columns in a Store table, whenever the value in the Store_Number column is Store#56, the value in the City column is Los Angeles. This relationship is many-to-one because there could be many stores in a city, but a given store can only be in one city. Similarly, the City column in the Store table may have a many-to-one relationship with a Region column in the Market table (e.g., if the city is Los Angeles, the region is always West).

Hierarchies allow precomputed views 36 that are grouped by columns of finer granularity to be used to rewrite queries grouped by columns of coarser granularity. For example, the existence of a Store_Number-to-City hierarchy allows the Store_Number values to be grouped into distinct City values. If a precomputed view 36 is grouped by Store_Number, it is not necessary to create another view grouped by City because the same view may be used to rewrite queries that constrain on one or both of these columns. The query rewrite system uses hierarchies 34 intelligently to rewrite queries that require a rollup beyond the scope of the precomputed view definition.

There are two types of hierarchies: those implicitly known to the query processing system, and those that must be explicitly declared by the database administrator.

Hierarchies that follow the path of a primary key/foreign key relationship or result from non-nullable unique column definitions are implicitly known to the query processing system. As a result, a view grouped by, for example, the Sales.Perkey column, where Perkey is a foreign key column that references, for example, the Period table, automatically may be used to rewrite queries grouped by any combination of columns in the Period table. This feature also applies to queries grouped by columns in outboard tables (i.e., tables referenced by dimension tables). For example, a view grouped by the Sales.Storekey column, where Storekey is a foreign key column that references the Store table and Store.Mktkey is a foreign key column that references the Market table, automatically may be used to rewrite queries that group by any combination of columns in the Store and Market tables.

Other hierarchies must be explicitly declared. For example, if a view is grouped by the Month column in the Period table and dependencies exist from Month to Qtr and from Qtr to Year, both dependencies need to be declared. After they have been declared, the query rewrite system may use the same precomputed view to rewrite queries grouped by any combination of the three columns. Declaring these dependencies also improves the performance of the Advisor. The mechanism for declaring a hierarchy is the CREATE HIERARCHY command. A CREATE HIERARCHY statement names pairs of columns that satisfy functional dependencies and identify the tables to which the columns belong.

Figure 5A:
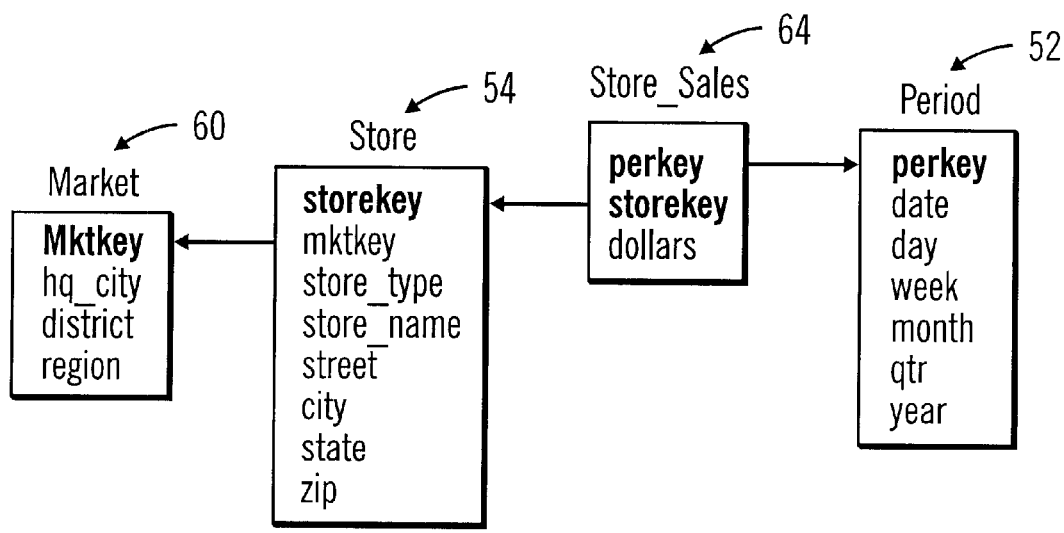
FIG. 5A is a diagrammatic view of retail schema, including an aggregate Store_Sales table.
Figure 5B:
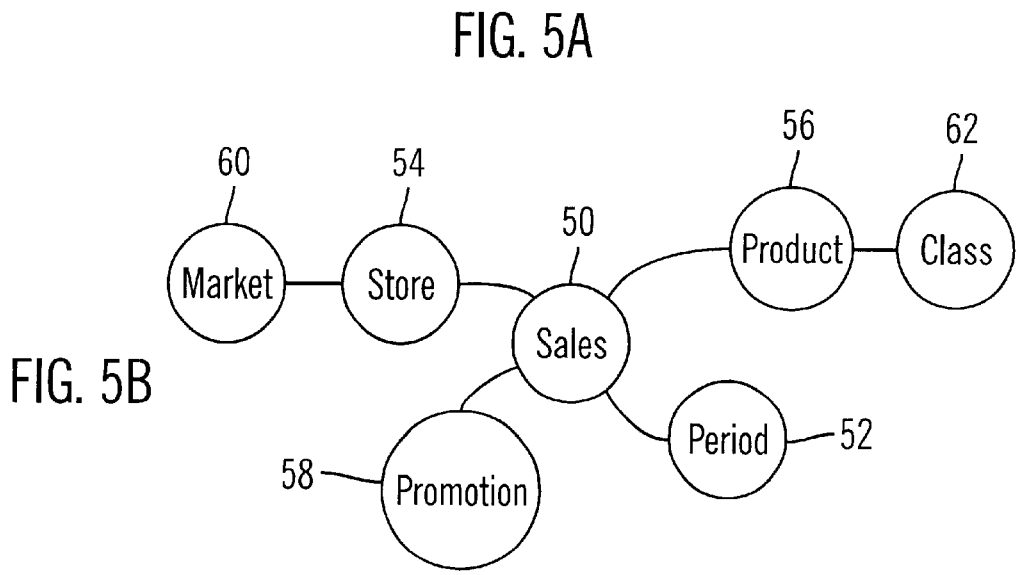
FIG. 5B is a diagrammatic view of a Sales table and its associated dimensions.

Referring to FIGS. 5A and 5B, in one embodiment, a retail database schema includes a Sales detail table 50, a Period dimension table 52, a Store dimension tale 54, a Product dimensional table 56, a Promotion dimension table 58, a Market dimension table 60, and a Class dimension table 62. The Market and Class tables 60, 62 are outboard tables. The dollars column in the Sales table represents totals per day, per store, per product, per promotion. For example, a single row in the detail table might record that on Jan. 2, 1999, the San Jose Roasting Company sold $95 of wholebean Aroma Roma coffee to customers using catalogue coupons. If users routinely submit queries that request sales totals per some time period, per some store or geographical area (e.g., per day, per region or per month, per state), the database administrator might define a Store_Sales table 64 that contains sales totals for all products and all promotions per day, per store. This aggregate table would retain the same relationship to Store dimension table 54 and Period dimension table 52 as the detailed Sales table, but it would not reference the other dimensions in the retail schema.

Figure 6:
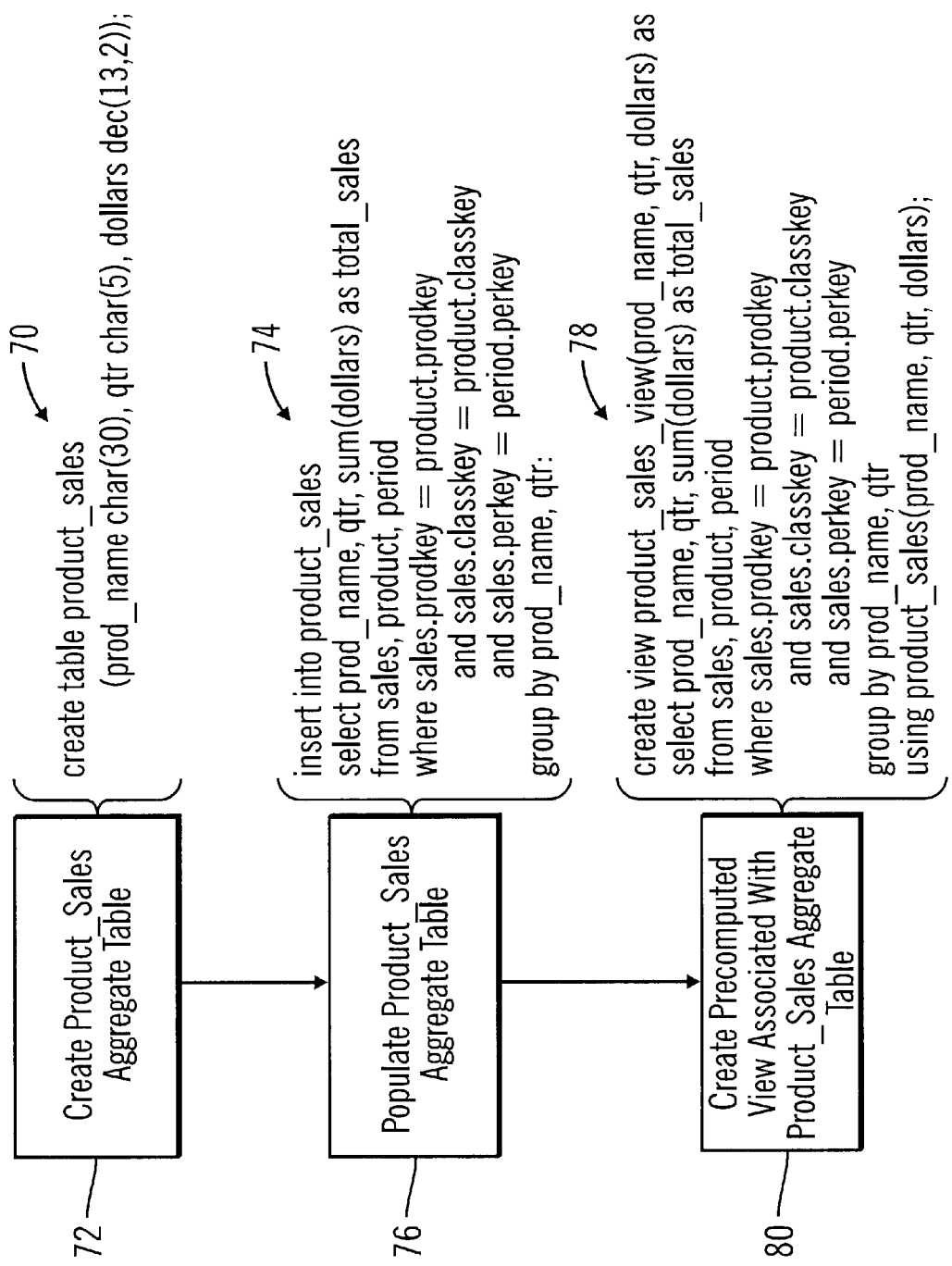
FIG. 6 is a diagrammatic view of a method of creating an aggregate table and an associated precompute view.

Referring to FIG. 6, in an embodiment relating to a retail sales analyst query for a report that compares sales totals for specific products during specific quarters, a database administrator may create a precomputed view as follows. In anticipation of repeated analyst queries for reports comparing sales totals for specific products during specific quarters, the database administrator creates a Product_Sales aggregate table using a CREATE TABLE statement 70 (step 72). The database administrator populates the Product_Sales table using an INSERT statement 74 (step 76). The database administrator then creates a precomputed view associated with Product_Sales aggregate table using a CREATE VIEW statement 78 (step 80). The query rewrite system may then intercept user queries, such as

```
select prod_name, qtr, sum(dollars) as total_sales
from sales, product, period
where sales.prodkey = product.prodkey
    and sales.classkey = product.classkey
    and sales.perkey = period.perkey
group by prod_name, qtr;
```

The query rewrite system may replace these queries with a scan of the Product_Sales aggregate table. The query rewrite system assigns table names, rewrites join predicates, and represents queries in a way that significantly improves query performance.

The invention provides additional precomputation functionality to both database administrators and users. In particular, the invention provides an intelligent method for database administrators to determine which precomputed views to create and maintain. This feature is especially useful because precomputing and maintaining aggregates for all combinations of points in all dimensions in a large data warehouse is impractical.

II. Functional Components

A. Meta Data Layer

1. Overview

The Meta Data Layer (described in detail below) stores aggregate table definitions and enables other system components (e.g., the Rewriter, the Advisor, and database server 12) to access these definitions. The Meta Data Layer stores information about precomputed views and dimensional hierarchies, and tracks the state of each precomputed table in relation to the detail tables from which it was computed. The dimensional hierarchies enable the invention to deliver multidimensional database functionality, such as rollups from aggregates on points in a dimension to other points of coarser granularity in the same dimension.

2. Precomputed Tables and Precomputed Views

Among the features of the Meta Data Layer are the following precomputed table and precomputed view support features. The Meta Data Layer maintains information about precomputed table definitions and relationships that are accessible by database administrators. The Meta Data Layer also allows precomputed tables to be defined through SQL. The Meta Data Layer tracks whether each precomputed table is in synch with its associated detail tables (i.e., whether or not the precomputed table accurately reflects the precomputed view definition). This feature enables the system to handle insertions into precomputed tables and updates to associated detail tables, operations which would otherwise invalidate the precomputed tables. The Meta Data Layer identifies mappings between precomputed table columns and associated detail table columns. The Meta Data Layer identifies grouping columns and aggregation columns for the aggregate tables. The Meta Data Layer identifies the aggregate expression (e.g., min(dollars) and sum(units)) for each aggregation column. The Meta Data Layer allows precomputed tables to have indexes built on them and foreign key/primary key constraints defined for them. These features allow precomputed tables to be hooked into the database schema and have star and other indexes built on them to improve query processing speed. The Meta Data Layer may identify relationships between precomputed tables, enabling the Rewriter to compute one precomputed table from another precomputed table. The Meta Data Layer allows arbitrary dimensional hierarchies, fact aggregate tables (tables aggregating facts from a fact table) and dimensional precomputed tables (tables that contain only grouping columns) to be defined.

3. Hierarchies

As explained above, a dimensional hierarchy is specified using a CREATE HIERARCHY statement. For example, consider the following hierarchy definition:

```
create hierarchy type-to-category
    (from product(type) to product(category));
```

This SQL command creates metadata representing the fact that type and category columns are points in the product dimension, and that aggregates (such as Sum(dollars)) grouped on the type column may be used to rollup to (compatible) aggregates on the category column. Another way to interpret the CREATE HIERARCHY statement is as a declaration of a functional dependency between two columns.

When denormalized dimension tables exist (for performance reasons), the CREATE HIERARCHY statement references columns from a single table. Hierarchies can also be specified between columns of different tables. Suppose that our example schema had normalized dimension tables. The product dimension may be represented in two tables as follows:

| | |
|---|---|
| product | (prodkey, pname, type, category-key) |
| class | (category-key, category, category-desc) |

In this case, the hierarchy between type and category would be defined as:

```
create hierarchy type-to-category
    (from product(type) to class(category));
```

Since these columns are in different tables, a join is required to perform this rollup and, therefore, the Metadata Layer requires a foreign key-primary key join constraint to exist between the product and class tables. These join constraints allow the Rewriter to perform the second class of rollups.

The Meta Layer also infers implicit hierarchies (functional dependencies), such as those between a primary key column and another column of the same table, as well as dependencies implied by transitivity. Explicit and implicit hierarchies allow the Rewriter to answer a large class of queries using a small set of precomputed aggregates.

B. Rewriter

A database administrator creates precomputed tables, loads precomputed tables (or uses existing precomputed tables), and defines associated precomputed views with query expressions that reflect the exact contents of the precomputed tables. A database administrator necessarily knows which precomputed views exist, but database users need not know this information. When a query is submitted by a user, the query rewrite system evaluates the precomputed views created by the database administrator and, if possible, rewrites the query to select information contained in aggregate tables, which typically are much smaller than the tables referenced in the original user query. Where possible, joins are simplified or removed and, depending upon the degree of consolidation that occurs between the detail and aggregate data, query response times are highly accelerated. Moreover, as explained below, queries may be rewritten against a precomputed view even when the query and the view definition do not match exactly.

The Rewriter rewrites user queries in terms of a relatively small set of precomputed views without requiring users to manually rewrite queries or to change their queries when precomputed views are dropped or added. The Rewriter intercepts aggregate queries and attempts to rewrite each query to use precomputed aggregates. This rewriting is done on a block-by-block basis, and includes correlated subqueries as well as blocks in union/intersect/except queries. The Rewriter uses a cost-based algorithm to choose among potential rewrites. The Rewriter is able to perform both types of rollups. Since the Rewriter is able to rollup efficiently from finer granularity aggregates to coarser granularity aggregates in the same dimension, the total number of precomputed aggregates may be reduced. These rollups may be performed when aggregates are grouped on both non-key and key columns corresponding to points in a dimension. The rewrites are performed transparently, thereby insulating users from the details of aggregate processing. Thus, user queries do not have to be changed if aggregates are dropped from the database or added to the database.

C. Advisor

The Advisor suggests what tables to precompute, and determines the effectiveness of existing precomputed tables based upon an analysis of query histories. The Advisor also provides a facility to log activity of user queries against data store 16. From the logged queries, a database administrator may analyze the use of existing precomputed tables in data store 16, and may identify for creation potential new views (candidate views) which may improve query performance.

As data store 16 is queried, the Advisor logs queries that are rewritten by the Rewriter and queries that would benefit from being rewritten if the appropriate aggregate table had existed. After a period of time, a database administrator may analyze the aggregate query logs by querying statistical reports (tables) created by the Advisor. One report (the RBW_PRECOMPVIEW_UTILIZATION table) provides information about the use of existing precomputed views in the database. Another report (the RBW_PRECOMPVIEW_CANDIDATES table) provides information about an optimal set of precomputed views that the Advisor suggests based upon user query history and existing precomputed views.

The Advisor system tables are generated from a detailed analysis of the information stored in the logs. The analysis is based upon algorithms that determine an optimal set of aggregate tables given the actual query history against data store 16. As part of the analysis, a benefit is assigned to each existing view and to each candidate view. The BENEFIT column in the Advisor system tables is a cost metric that reflects the number of rows saved by processing the query through the precomputed view rather than the associated detail table or the next best view; as well as the number of times the view has been used (for existing views) or the number of times the view would have been used (for candidate views).

The logging mechanism of the Advisor examines each user aggregate query submitted. If no precomputed tables exist, the logging mechanism will record which, if any, candidate precomputed tables would be useful to answer the query. The generated candidate typically is not an exact match of the query, but rather one that can be used to efficiently answer (through rollups) a broad range of user queries involving the same dimensions as the user query (or some subset of these dimensions). In this way, the Advisor reduces the number of precomputed tables that need to be stored. In other words, based on actual query histories, the Advisor allows intelligent materialization (precomputation) of a subset of all possible precomputed tables (e.g., precomputed tables grouped on all combinations of dimensions and points along dimensions).

If precomputed tables exist and the Rewriter transforms the query to use an existing precomputed table, the Advisor logging mechanism records information about precomputed table usage. If the Advisor can suggest a more effective (nonexistent)precomputed table as a candidate for precomputation, this candidate will also be logged.

The Advisor features a relational SQL-based interface, which is made possible by having the Advisor integrated with the database server. A database administrator may use SQL commands to access Advisor-specific tables and obtain information on the utilization of existing precomputed tables, and on the candidate precomputed tables that should be created. The Advisor also features a mechanism for limiting the set of precomputed tables that must be analyzed to a small subset of all possible precomputed tables. In addition, while analyzing existing and potential candidate precomputed tables, the Advisor uses logged reference counts and rewritability of one precomputed table by another (using the Rewriter).

D. Server Integration

The invention supports precomputed views in a way that is fully integrated into a database server, increasing the scope of performance optimizations and the ability to share meta data with the server. Queries are intercepted and rewritten by database server 12, not by a separate piece of software.

Among the advantages of full integration are the following. Aggregation information is stored in the system tables along with all the other metadata for the database, making knowledge of all database activity centralized. The result of this integration is consistency and the ability to use the enhanced meta data for query compilation and optimization regardless of whether precomputed views are used. For example, if aggregate table data is out of synch with detail data, the system knows about it instantly and does not use the table to rewrite queries (unless requested to do so). In addition, optimization strategies are known to query processing system 18 as a result of full integration.

III. Detailed Operation

A. Overview

Figure 7A:
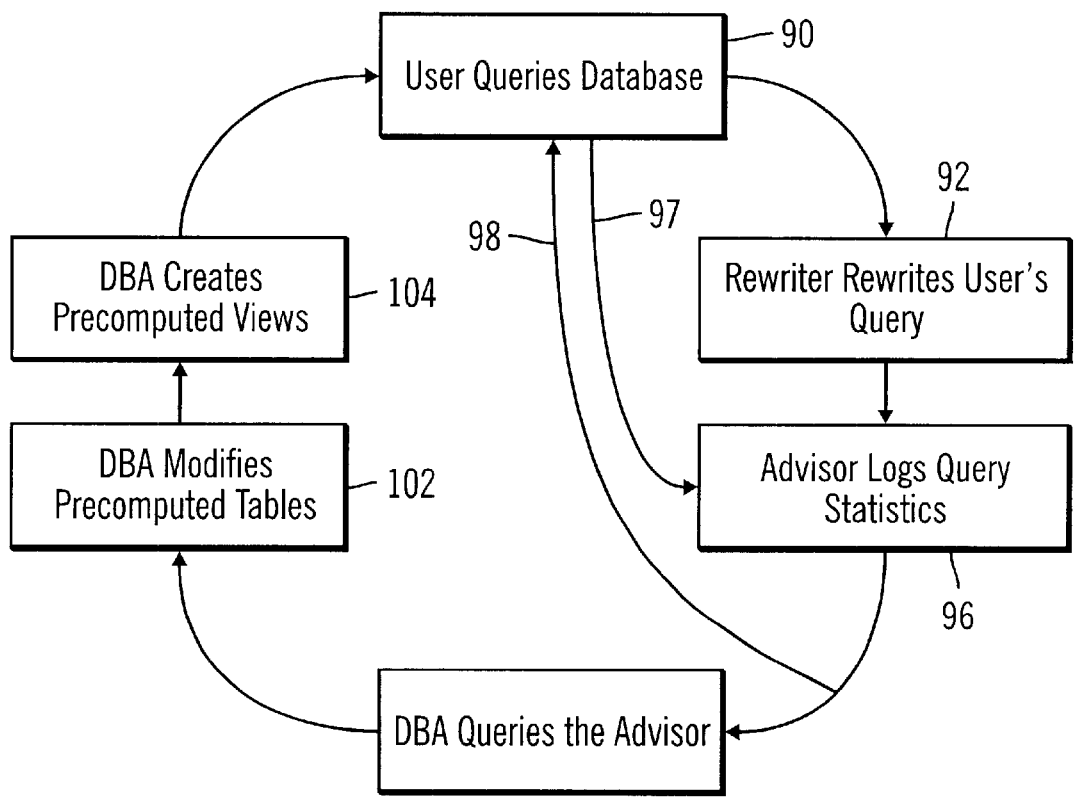
FIG. 7A is a flow diagram of a method of managing precomputed views.
Figure 7B:
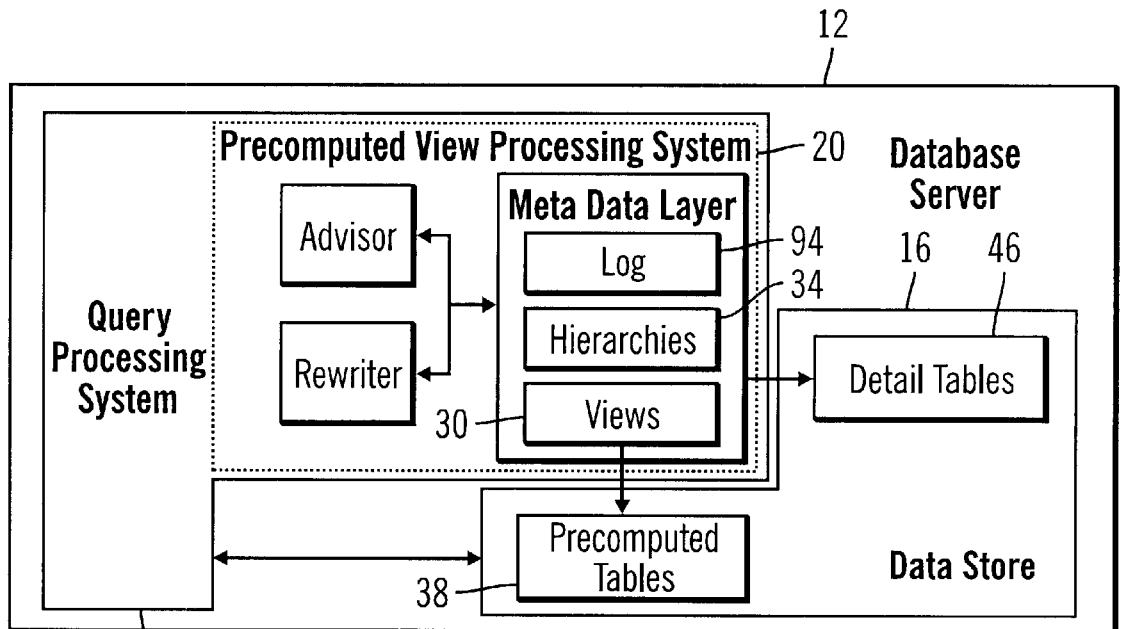
FIG. 7B is a diagrammatic view of components of a database server.

Referring to FIGS. 7A and 7B, in one embodiment, a database administrator may continuously improve the aggregation strategy used by query processing system 18 as follows. In operation, a user sends a query to database server 12 over network 14 (step 90). Initially, the database administrator may or may not have created one or more precomputed tables. If no precomputed tables have been created, the Rewriter cannot rewrite the query; instead, query processing system 18 directly accesses detail tables 46 of data store 16 to execute the query. If one or more precomputed tables have been created, the Rewriter attempts to rewrite the query using the precomputed tables (step 92). The Advisor generates (and stores in a log 94 of the Meta Data Layer) reports for queries that are rewritten by the Rewriter (step 96) and for queries that would benefit from being rewritten if the appropriate precomputed table had existed (step 97). After a period of time (represented by return loop 98), a database administrator may use the Advisor to analyze the query logs by querying the statistical reports (tables) created by the Advisor (step 100). Based on the information learned from querying the Advisor system tables, the database administrator modifies the existing precomputed table set by adding (defining and populating) new precomputed tables or by dropping existing precomputed tables (step 102). The database administrator also creates precomputed views for each of the new precomputed tables (step 104).

By this method, query performance improves, but the user's view of the database schema does not change because the user queries the same set of detail tables 46 over time.

B. Meta Data Layer

The Meta Layer has two levels of external interfaces: a RISQL enhancement for the database administrator to define aggregate table information, and programmatic interfaces for communicating with the other components of database server 12. The Meta Data Layer tracks all metadata information and provides a different external view of that metadata information to the database administrator through system tables, to a compiler, and to a loader. In one embodiment, the metadata information may be created and modified only by a database administrator using RISQL.

1. External User Interface

As mentioned above, the process of defining an aggregate table involves creating a table that will be used to store the aggregate data, and then defining an aggregate view which defines the relationship between the data in the aggregate table and the data in the detail tables. A database administrator may create an aggregate table definition with the following expression:

```
CREATE VIEW [view_name] AS [query_expression]
    USING [table_name] ([table_column_name])
```

Here, view_name is the name of the materialized view, table_name is the name of the aggregate table, and the table_column_name is the list of columns in the aggregate table that are mapped one-to-one in order with the columns that would be returned by the query expression if it were expressed as a SELECT statement. In one embodiment, the query_expression is limited to the following form:

```
SELECT [grouping_column, or aggr_column]
FROM [table_name_list]
WHERE [join_predicate_list]
GROUP BY [grouping_column]
```

The columns specified in the GROUP BY column are the grouping columns. The grouping columns in the SELECT list must exactly match the columns specified in the GROUP BY clause. Aggregate columns are columns of the form aggr(expr), where aggr( ) is one of SUM( ), MIN( ), MAX( ), COUNT( ), or COUNT(DISTINCT( ), and expr is a simple expression derived from a column or columns in a detail table or a numeric literal or both. In this embodiment, the WHERE clause may contain only join predicates that relate the tables listed in the FROM clause. Join predicates may join tables only through foreign key/primary key relationships. Furthermore, these foreign key/primary key join predicates may be specified only outward from the detail table specified in the query expression. In this way, the detail table may be identified by virtue of it being at the heart (i.e., the location from which the foreign key/primary key relationships point outward) of the join, or by virtue of it being the table from which all aggregate columns are derived.

As with creating aggregate tables, dropping aggregate tables may be a two-step process. First, the database administrator drops the view associated with the aggregate table using the DROP VIEW expression. Next, the database administrator drops the aggregate table itself using the DROP TABLE expression.

Figure 8:
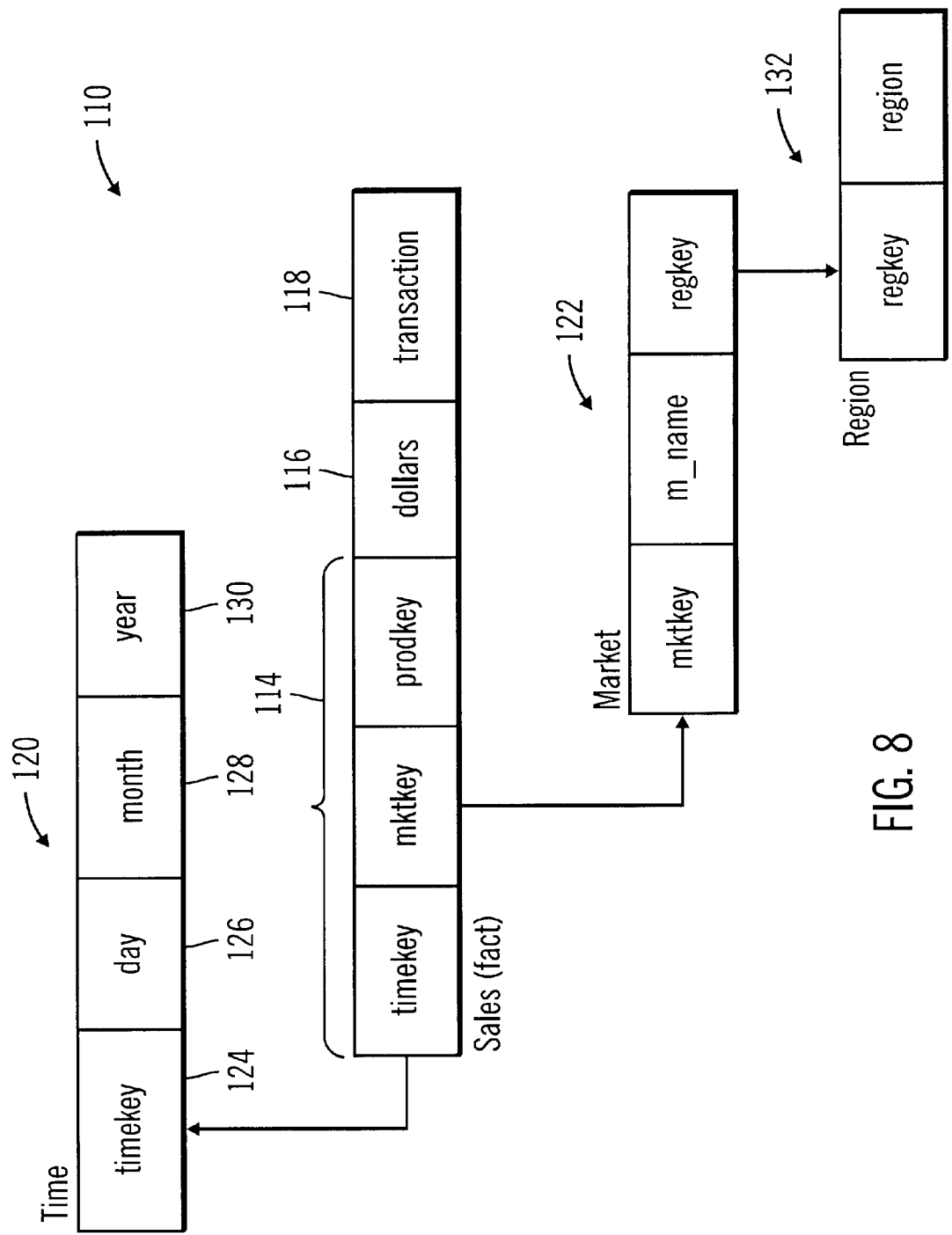
FIG. 8 is a diagrammatic view of foreign key/primary key relationships between an aggregate table and its associated dimensions.

Referring to FIG. 8, in an illustrative retail context, a sales schema 110 includes a sales fact table 112 with a multi-column primary key 114 (timekey, mktkey, prodkey), along with columns dollars 116 and transaction 118. Sales fact table 112 has a time dimension and a market dimension represented by a time table 120 and a market table 122. Time table 120 has a primary key 124 (timekey), as well as a day column 126, a month column 128 and a year column 130. Time table 120 is denormalized because there is a many-to-one mapping from day to month, and from month to year. Market table 122 includes a region outboard table 132 (i.e., a dimension of a dimension).

In one example, an aggregate table sales1_agg may be created by aggregating by both time and market using the key columns, as follows:

```
create table sales1_agg(
    tkey int not null,
    mkey int not null,
    sum_dollars int,
    primary key (tkey, mkey),
    foreign key (tkey) references Time,
    foreign key (mkey) references Market);
create view agg1view
    as select timekey, mktkey, sum(dollars)
    from sales
    group by timekey, mktkey
    using sales1_agg(tkey, mkey, sum_dollars);
```

Aggregations by key columns allows simple rollup in either of the time or market dimensions. For example, a query that requests the total sales by region, or total sales by month or year, may be computed from the sales1_agg aggregate table. Another advantage of aggregating by key columns is that star indexes may be created on the aggregate table. For example, a star index may be created on sales1_agg(tkey, mkey). Queries that constrain on these dimensions may be serviced by a starjoin on the aggregate table.

In another example, an aggregate table sales2_agg may be created by aggregating by non-key columns, as follows:

```
create table sales2_agg(
    day int not null,
    sum_dollars int,
    primary key (day));
create view agg2view
    as select day, sum(dollars)
    from sales, time
    where sales.timekey = time.timekey
    group by day
    using sales2_agg(day, sum_dollars);
```

The sales2_agg aggregate dimension table may be used to answer a query that selects day and sum(dollars) from sales and time grouped by day; the sales2_agg eliminates the join from the sales table to the time table. In order to compute total sales by month, however, the time table must be joined to pick up the month for each day value; extra distinct processing is needed because day is not a unique column.

Non-key rollup performance may be improved by defining dimensional aggregate tables. In the above example, a time_agg table with columns (day, month, year) and a primary key of day would improve query performance. A foreign key/primary key relationship from sales2_agg to time_agg along with the associated star index may be added. In this case, when a query asks for total sales by year (naming sales and time in the query), the query may be rewritten to use sales2_agg and time_agg, and a starjoin may be used when performing the query.

The database administrator may define rollup hierarchies which enable rollups from non-key columns to other columns, as follows:

CREATE HIERARCHY [hierarchy_name](FROM[f_table(f_col)]TO [t_table(t_col)]ON fkname)

This expression allows the database administrator to define many-to-one relationships between two columns that may or may not be in the same table. Hierarchies may be dropped using the DROP HIERARCHY expression.

2. External API Specification

The Meta Data Layer supports query rewriting by enabling the Rewriter to determine which materialized views are relevant to a query, and determine if and how one column may be rolled-up to another.

In one embodiment, to determine which materialized views are relevant to a query, the query processing system sends to the Meta Data Layer a list of tables in the query, and the Meta Data layer returns a list of compatible aggregate tables (including their parse trees, column mappings, and whether or not they are valid). An aggregate table is compatible with the query if the tables upon which it is defined (in the FROM clause) is a subset of those tables in the query. In an alternative embodiment, the query processing system may request from the Meta Data Layer all aggregates built upon a given detail table.

A combination of rollup (hierarchy) information and foreign key/primary key relationships may by used to determine whether one column may be rolled-up into another column.

The Meta Data Layer maintains certain system tables.

The RBW_VIEWS table tracks information about whether or not views are materialized, and other general information about the materialized views. The RBW_VIEWS table includes the following columns: NAME, CREATOR, PRECOMPVIEW, PRECOMPVIEW_TABLE, DETAIL_TABLE, VALID, and COMMENT. The PRECOMPVIEW column denotes whether the table is materialized or not. If PRECOMPVIEW is false, then PRECOMPVIEW_TABLE, DETAIL_TABLE, and VALID are all NULL. If PRECOMPVIEW is true, PRECOMPVIEW_TABLE denotes the name of the table into which the view is materialized; DETAIL_TABLE denotes the detail table on which the aggregate table is defined; and VALID indicates whether the data in the materialized view is in synch with the data in the detail table.

The RBW_PRECOMPVIEWCOLUMNS table displays the relationships between columns in the aggregate table and the detail table. The RBW_PRECOMPVIEWCOLUMNS table includes the following columns: TABLE, TABLE_COLUMN, VIEW, and VIEW_COLUMN. Using this table, the mapping to the appropriate view and view column may be identified given an aggregate table name (TABLE) and column in that aggregate table (TABLE_COLUMN).

The RBW_COLUMNS table provides information about the data types of the columns. The RBW_VIEWTEXT table provides additional information about the columns (e.g., whether a column is a grouping column or an aggregate column, and the expression of the aggregate columns).

The RBW_HIERARCHIES table tracks rollup hierarchies by listing column relationships. The RBW_HIERARCHIES table includes the following columns: NAME, FROM_TABLE, FROM_COLUMN, TO_TABLE, TO_COLUMN, and CONSTRAINT_NAME. The CONSTRAINT_NAME column will be NULL if the FROM_TABLE column is the same as the TO_TABLE column.

3. Internal Features

The Meta Data Layer stores families of structures (block types) in a system catalog. One family of structures corresponds to precomputed table column definitions; the other family of structures corresponds to rollup hierarchy definitions. The hierarchy definition block type is loosely based on the primary key/foreign key relationship structure. Both the hierarchy definitions and rollup hierarchies are of fixed size and multiple instances fit in a single block.

Whenever the database administrator adds or drops a view definition, or adds or drops a hierarchy definition, the system catalog is modified to reflect the change. Because these structures mimic the foreign key/primary key relationship storage, the access methods are similar.

The Meta Data Layer provides at least two interfaces to the Rewriter for retrieving data. The first retrieves a list of precomputed tables associated with a given detail table. The second determines whether or not a rollup path exists between two columns and, if so, the Meta Data Layer generates a list of rollup paths. Rollup is possible if the FROM_COLUMN is a primary key or a non-nullable unique column, or if there is a rollup defined from the FROM_COLUMN to the TO_COLUMN, or through the transitive set of functional dependency relationships.

C. Rewriter

A detailed description of the Rewriter is provided in U.S. Application Ser. No. 09/049,784, filed Mar. 27, 1998, and entitled "System and Method For Rewriting Relational Database Queries," which is incorporated herein by reference.

D. Advisor

As mentioned above, the Advisor assists the database administrator in determining which precomputed tables would provide the greatest query performance improvement, whether those tables currently exist or not. Since the Advisor knows exactly what types of queries can be rewritten by the Rewriter, the Advisor is able to suggest directly the kinds of precomputed views that should be built into the database. The Advisor provides a cost-benefit analysis of existing and potential precomputed views. The Advisor also provides a facility to log activity of aggregate queries against a database. The logs files are created when logging is enabled, either at system startup or when activated by the database administrator. From this information the database administrator may analyze the use of existing aggregates in the database, and may evaluate potential new aggregates to create that, with the Rewriter, may improve query performance.

Figure 9:
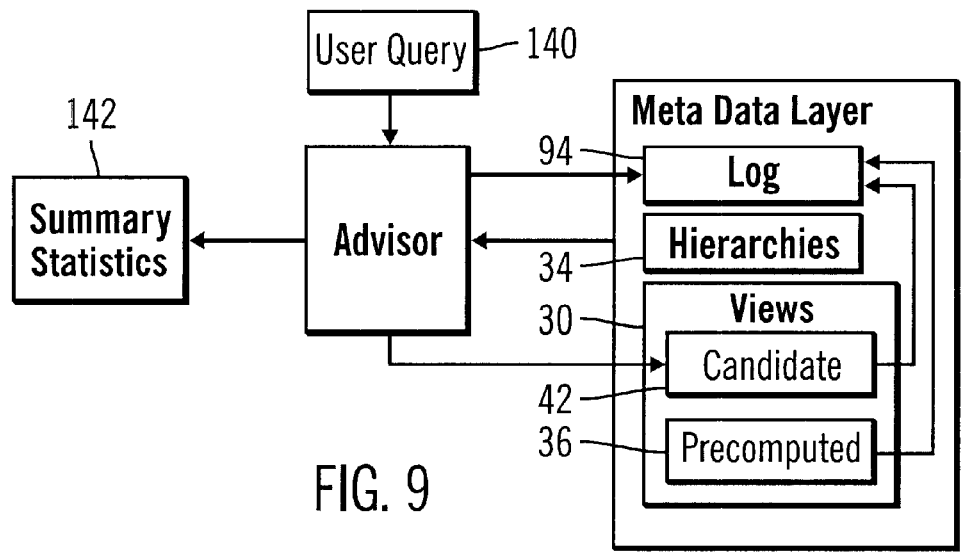
FIG. 9 is a diagrammatic view of an advisor configured to log query information and to generate candidate views and summary statistics based upon meta data, including information contained in the log, hierarchies, and information relating to candidate and precomputed views.

As shown in FIG. 9, the Advisor receives a user database query 140 from query processing system 18. The Advisor generates logs records for queries that are rewritten by the Rewriter and for queries that would benefit from being rewritten if the appropriate aggregate tables had existed, and stores these records in log 94 in the Meta Data Layer. The advisor uses the log records, as well as other meta data, such as information relating to hierarchies 34, to generate one or more candidate views 42. Information about candidate views 42 and precomputed views 36 are also stored in log 94. The Advisor also uses meta data information to generate summary statistics 142, including the Advisor system tables (RBW_PRECOMPVIEW_CANDIDATES and RBW_PRECOMPVIEW_UTILIZATION). The database administrator may analyze the information contained in log 94 by querying the Advisor system tables. The results of queries on the Advisor system tables may be inserted into a new or temporary table which may be queried by the database administrator.

1. Logging Query Information

When Advisor query logging is enabled, the Advisor logs all queries that are rewritten to access data in precomputed views 36. The Advisor also logs candidate views 42 that, if they had existed, they would have been used for rewriting queries. The database administrator may access candidate views by querying the RBW_PRECOMPVIEW_CANDIDATES table. The Advisor also logs information about correlated subqueries to the Advisor log files. Correlated subqueries execute the same query multiple times, but with different values. Queries that contain a table or a subquery that is not related (via a primary key/foreign key relationship) to the other tables in the query are not logged, however, even though these queries could be rewritten if an appropriate precomputed view existed.

Figure 10:
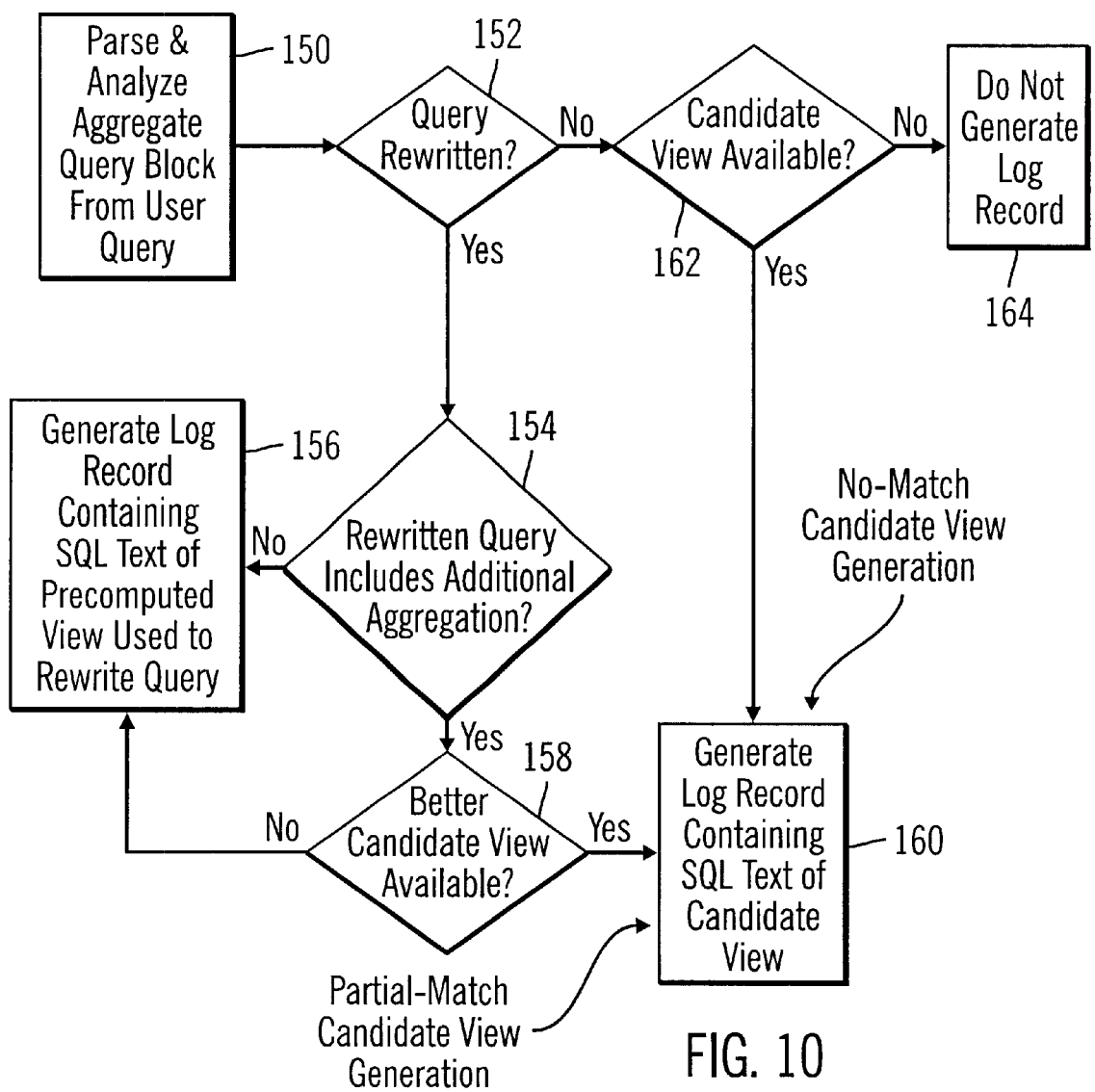
FIG. 10 is a method of generating a log record based, at least in part, upon a user aggregate query block.

Referring to FIG. 10, in one embodiment, the Advisor generates log records as follows. The Advisor parses and analyzes each aggregate query block in the user query (step 150). If the aggregate query block was rewritten by the Rewriter to use an existing precomputed view (step 152), a log record is generated. If the rewritten query did not involve additional aggregation (step 154), a log record is generated that contains the SQL text of the precomputed view used to rewrite the aggregate query block (step 156). The same log record is generated (step 156), if the rewritten query involved additional aggregation (step 154), but a better candidate view could not be recommended to further improve query performance (step 158); if a better candidate could be recommended (step 158), a log record is generated that contains the SQL text of the candidate view (step 160; partial-match candidate view generation). If the Rewriter did not rewrite the aggregate query block (step 152) but a candidate view could be recommended (step 162), a log record is generated that contains the SQL text of the candidate view (step 160; no-match candidate view generation). If the Rewriter did not rewrite the aggregate query block (step 152) and a candidate view could not be recommended (step 162), no log record is generated (step 164).

The following information may be stored in a log file: timestamp; database name; detail table identifier; identifier of view used to answer query (otherwise Null); rollup information; elapsed time for the query and for each aggregate block within the query; SQL text for this aggregate block.

2. Generation of Candidate Views

The candidate view generation process involves analyzing an aggregate query block to determine whether a precomputed view could be suggested that would have been used to rewrite the aggregate query if that precomputed view had been created. The end result of this process is SQL text that defines the select part of a precomputed view definition. A precomputed view created using this definition (along with the associated aggregate table) is guaranteed to be used in executing the query block (assuming that there were no better precomputed views and that all the necessary view validation and query rewrite settables are enabled).

Figure 11:
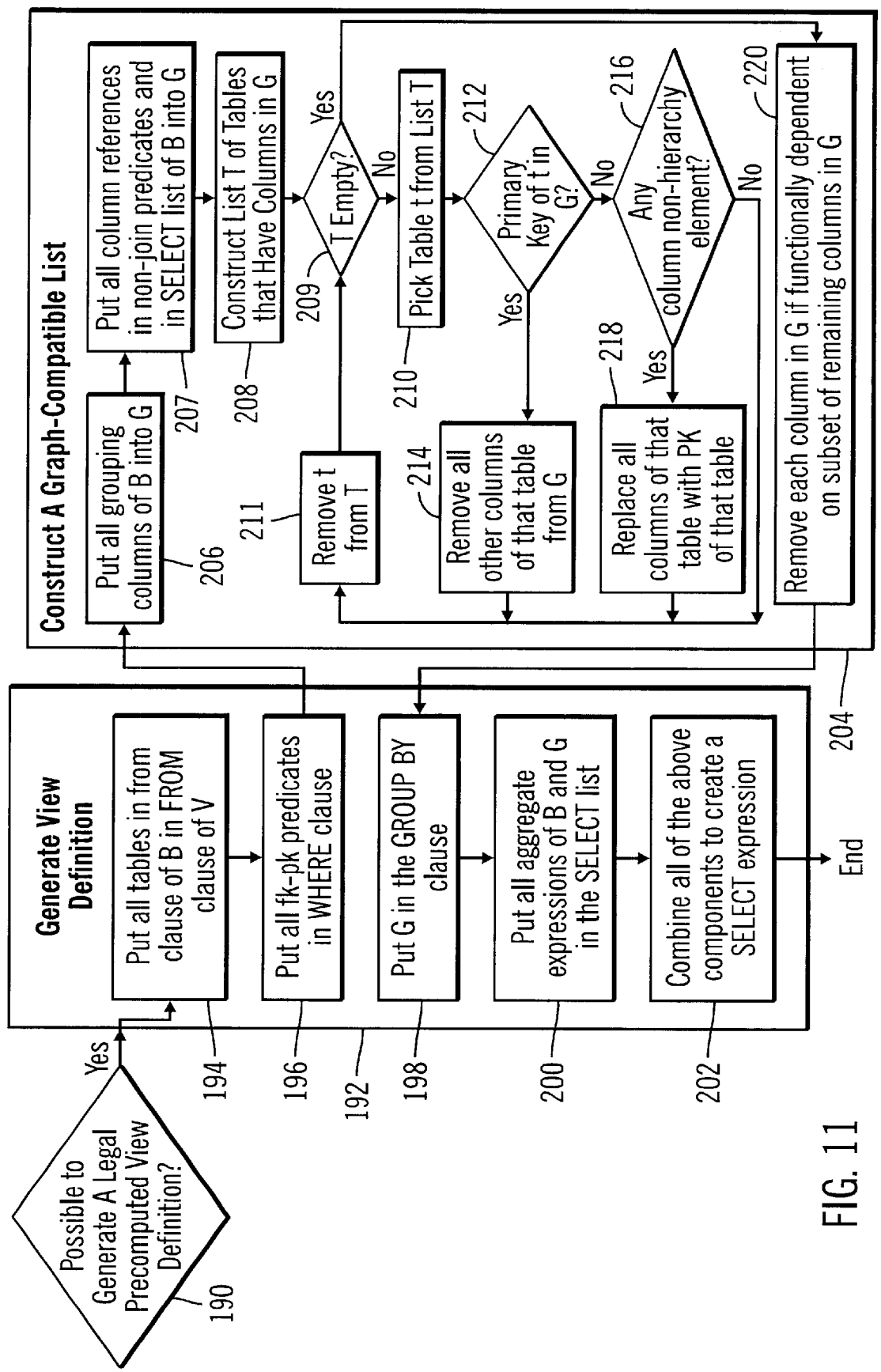

Referring to FIG. 11, given a query block B, its associated query Q and a hierarchy graph FG, in the case where the Rewriter did not rewrite the aggregate query block but a candidate view could be recommended (no-match candidate view generation), a candidate view definition V may be generated as follows.

First, the Advisor determines whether it is possible to generate a legal precomputed view definition (step 190). The definition of a "legal" precomputed view depends on the classes of precomputed views that are supported by the system, and this definition may be modified to accommodate changes in the classes of precomputed views supported. In addition, the Advisor determines whether the query block may be rewritten to use the precomputed view that would be generated. In one embodiment, a view definition may not be created if any of the following conditions is true:

(i) the FROM clause of B contains subqueries or multiple occurrences of the same table;

(ii) the FROM clause of B contains a precomputed view table or a system table;

(iii) the block B references columns that either are rowpointers, segids, or subqueries;

(iv) if any block in Q has outer joins, reset by, break by or references a precomputed view;

(v) if B's project list has a distinct (the distinct did not get converted by a GROUP BY);

(vi) the foreign key/primary key predicates of B reference subqueries;

(vii) a snowflake style graph cannot be constructed for B. To check this condition, construct a join graph using the tables in the FROM clause and foreign key/primary key predicates. A foreign key/primary key predicate between two tables A and B is represented as an edge starting from the referencing table (the table containing the foreign key in the predicate) to the referenced table (the table containing the primary key). Find the center of the join (i.e., a node that has no incoming edges); this is a candidate fact table (F). Determine if the remaining nodes are reachable from the candidate fact table and if a node does not have more than one incoming edge. The join graph (JG), fact table (F) and foreign key/primary key predicates (P1) are stored for later use (viii) the aggregate expressions in the query do not fall under the class of allowable aggregates in a precomputed view definition;

(ix) there are aggregates in subqueries that are correlated to this block;

(x) the GROUP BY list of B does not constitute an allowable GROUP BY clause of a precomputed view definition;

(xi) the grouping list G (which may differ from the original grouping list of B) cannot be constructed as follows. Define G1 as a list consisting of the following: all the columns referencing the tables in B appearing in non-foreign key/primary key predicates, the SELECT list, and the grouping list of B, ignoring column references inside aggregate expressions. Construct the list G which is a "graph-compatible" version of G1 (see steps 206 and 208, below). If such a G can be constructed store it for later use.

Second, the Advisor generates the view definition V as follows (process 192). Put all tables in the FROM clause of B in the FROM clause of V (step 194). Put all foreign key/primary key predicates (P1) in the WHERE clause (step 196). Put G in the GROUP BY clause (step 198). Put all aggregate expressions of B and G in the SELECT list (step 200). Combine all of these components to create a SELECT expression (step 202).

The Advisor constructs a graph-compatible list G from G1 as follows (process 204). Put all grouping columns of B into G (step 206). Also put all column references in non join predicates and in the SELECT list of B into G, ignoring column references inside aggregate expressions (step 207). Construct a list T of tables that have columns in G (step 208). For each table that has a column in G (iterative steps 209, 210, 211), determine whether the primary key of that table is in G (step 212). If so, remove all other columns of that table from G (step 214); if not, determine if any one of the columns is a non-hierarchy element (step 216). If so, remove all columns of that table and replace them with the primary key of that table (step 218). Finally, remove each column in G that is functionally dependent on some subset of the remaining columns in G based upon the information contained in the hierarchy graph FG (step 220).

Figure 12:
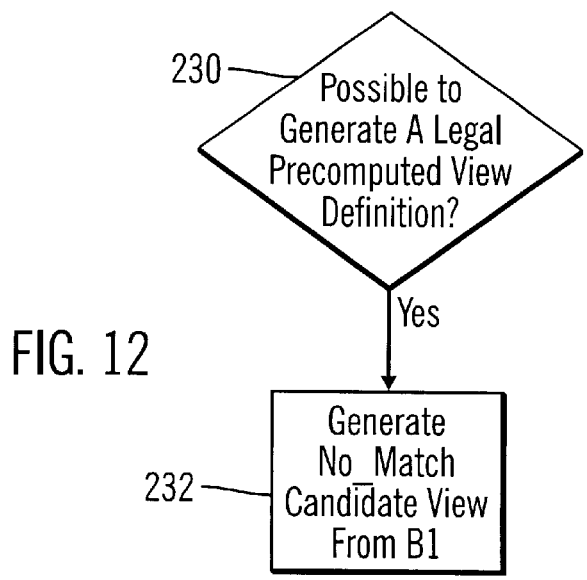
FIGS. 11–13 are flow diagrams of a method of generating candidate views and statistical reports based, at least in part, upon user query history.

Referring to FIG. 12, given a query block B, its associated query Q and a hierarchy graph FG, in the case where the rewritten query involved additional aggregation and a better candidate could be recommended (partial-match candidate view generation), a candidate view definition V may be generated as follows.

First, the Advisor determines whether it is possible to generate a legal precomputed view definition (step 230). The definition of a "legal" precomputed view depends on the classes of precomputed views that are supported by the system, and this definition may be modified to accommodate changes in the classes of precomputed views supported. In addition, the Advisor determines whether the query block may be rewritten to use the precomputed view that would be generated. In one embodiment, a view definition may not be created if any of the following conditions is true:

(i) the FROM clause of B does not contain any precomputed views;

(ii) B references rowids, segids or segnames;

(iii) B has more than one precomputed view that has aggregate expressions;

(iv) B has more than one precomputed view and none of them has an aggregate expression;

(v) B has a subquery that has more than one table in its FROM clause or has a subquery that references a precomputed view or has a subquery that has aggregate expressions or has a subquery whose SELECT list has expressions that are not simple column references.

(vi) a candidate view for a reverse-engineered B1 (built by composing B, the precomputed view definitions and subqueries in the FROM clause of B) cannot be built using the candidate view generation process described above in connection with no-match candidate view generation (step 192).

If a no-match candidate view generation test passes the reverse-engineered query B1 generated in step (vi) above, the Advisor generates the no-match candidate view from B1 (step 232).

3. Generation of Statistical Reports a. Overview

As explained above, the database administrator may use the Advisor to understand the utilization of each view and to get a sense of the costs and benefits of each view with respect to other views answering the same query. The database administrator may also use the Advisor to determine ways to improve the performance of aggregate queries; in particular, the Advisor provides recommendations to the database administrator as to which views to create and how many views to create. The scope of analysis may be constrained by date range and specific detail table. The Advisor scans the log file for queries referencing the specified detail table within the given date range. If the database administrator does not specify a date range, the Advisor scans all the existing Advisor log files for queries referencing the specified detail table. For each view associated with the specified detail table, the reports may include a view name, utilization count (total number of times the view was used to answer queries), rollup count (total number of times the view was used to answer hierarchical relationships), and the size of the view. The Advisor also creates a unique list of views either by scanning the log files or by querying the RBW_VIEWS system table for all the materialized and candidate views associated with the specified detail table. The Advisor uses this list to define an analysis space and to generate a dependency graph. It will then apply a cost formula to calculate the benefits of one precomputed view in the graph with respect to other views that can answer the same queries.

The RBW_PRECOMPVIEW_CANDIDATES table contains information which is used to analyze the benefits of creating new precomputed views that would improve the performance of certain queries. This information also may be used by the database administrator to decide which precomputed views to create. The RBW_PRECOMPVIEW_CANDIDATES table contains one row for each potential candidate view based on the queries that are logged and one row for each existing view. The RBW_PRECOMPVIEW_CANDIDATES table contains the following columns:

TABLE

| RBW_PRECOMPVIEW_CANDIDATES | | |
|---|---|---|
| Column Name | Column Type | Column Description |
| DETAIL_TABLE_NAME | CHAR(128) | Name of the detail table. This column must be constrained with a single detail table per query. |
| START_DATE | TIMESTAMP | Start date for aggregate query analysis. Scope of analysis is defined by an equality constraint on the specified data range. |
| END_DATE | TIMESTAMP | End date for aggregate query analysis. Scope of analysis is defined by an equality constraint on the specified date range. |
| AGGR_ELAPSED_TIME | INTEGER | Time, in seconds, spent in executing aggregate parts of the query sub-plans for a group of queries that could be represented by a candidate view. |
| REFERENCE_COUNT | INTEGER | Number of times a candidate view would have been used to answer queries referencing the specified detail table. |
| SAMPLE_VIEW_NAME | CHAR(128) | Name of an existing view defined on the specified detail table that contains a subset of the rows in the detail table. Use this to limit the scope of analysis to a portion of the detail table. This speeds up the processing time of the Advisor analysis. |
| SIZE | INTEGER | Size (number of rows) of the precomputed view. If SAMPLE_VIEW_NAME column is constrained, the value is the size of the sample view. |
| REDUCTION_FACTOR | DOUBLE (FLOAT) | (Detail table size/View size). Size is defined as number of rows. This indicator can be used to predict the reduction in average number of rows processed for a query. If SAMPLE_VIEW_NAME colunm is constrained, the value is (Sample view size/View size). |
| BENEFIT | DOUBLE (FLOAT) | Benefit of a view with respect to the set of views being analyzed. I.e., the benefit if a view is computed by considering how it can improve the cost of evaluating views, including itself. |
| NAME | CHAR(128) | Name of an existing precomputed view defined on the specified detail table. Null for candidate views. |
| SEQ | INTEGER | Sequence number of the view text for SQL text greater than 1,024 bytes. |
| TEXT | CHAR(128) | SQL text representing the candidate view's definition. |

The SAMPLE_VIEW_NAME column enables the database administrator to perform Advisor analysis on a smaller set of data to improve the performance of Advisor queries.

When constrained on the SAMPLE_VIEW_NAME column, the scope of the Advisor query is limited to the view name referenced in the column. The database administrator should create a sample view that contains a representative sample of the data in the database and that has the following characteristics: it maps to a subset of the rows in a detail table; it has a column corresponding to each of the columns in the detail table; and the data types of the columns in the sample view exactly match the data types in the detail table.

The RBW_PRECOMPVIEW_CANDIDATES table can be used to guide the database administrator in creating new views to help the performance of certain queries. For example, let's assume the database contains no aggregate tables, and the database administrator would like to know what are the most beneficial aggregate views he should create on the Sales table:

```
Select reference_count, benefit, text, seq
   From rbw_precompview_candidates
   Where detail_table_name = 'SALES';
```

The scope of the above analysis can further be constrained to a date range:

```
Select reference_count, benefit, text, seq
   From rbw_precompview_candidates
   Where detail_table_name = 'SALES' and
      start_date = date('1996-01-01') and end_date =
      date('1996-03-30');
```

The RBW_PRECOMPVIEW_UTILIZATION table contains information used by the database administrator to analyze the value of precomputed views that were created for a specific detail table. It also provides insight on a specific view's utilization and the costs and benefits of that view with respect to other views answering the same query. The RBW_PRECOMPVIEW_UTILIZATION table has one row for every valid precomputed view defined in the database, including views that are set to a valid state by the database administrator. The RBW_PRECOMPVIEW_UTILIZATION table includes the following columns.

TABLE

| Column Name | Column Type | Column Description |
|---|---|---|
| RBW_PRECOMPVIEW_UTILIZATION | | |
| DETAIL_TABLE_NAME | CHAR(128) | Name of the detail table. This column must be constrained with a single detail table per query. |
| START_DATE | TIMESTAMP | Start date for aggregate query analysis. Scope of analysis is defined by an equality constraint on the specified data range. |
| END_DATE | TIMESTAMP | End date for aggregate query analysis. Scope of analysis is defined by an equality constraint on the specified date range. |
| NAME | CHAR(128) | Name of precomputed view defined on the specified detail table. |
| SIZE | INTEGER | Size of the precomputed view (number of rows). |
| REDUCTION_ | DOUBLE | (Detail table size/View size). |

TABLE-continued

| Column Name | Column Type | Column Description |
|---|---|---|
| RBW_PRECOMPVIEW_UTILIZATION | | |
| FACTOR | (FLOAT) | Size is defined as number of rows. This indicator can be used to predict the reduction in average number of rows processed for a query. |
| BENEFIT | DOUBLE (FLOAT) | Benefit of a view with respect to the set of views being analyzed. |
| ROLLUP_COUNT | INTEGER | Number of times this view was referenced to answer queries asking for a subset of this view's Grouping columns or asking for an attribute of a dimension of less granularity. |
| REFERENCE_COUNT | INTEGER | Number of times a view was used to answer queries referencing the specified detail table. |
| NON_EXACT_MATCH_COUNT | INTEGER | Number of times a view was used to retrieve information that was not an exact match of what was stored in the precomputed view (e.g., a query that performs another aggregation on the data in the precomputed view). |

The NON_EXACT_MATCH_COUNT column identifies how many times a view in the database was used to calculate answers to question where some additional aggregation was needed. If the count in this column is high, it suggests that other precomputed views might improve query performance. An exact match occurs when a query is answered by a precomputed view without performing additional aggregation on the precomputed view. There may be some predication on the query (e.g., a Where clause or a Having clause) and there can be some formatting (e.g., an Order By clause), but no extra aggregation (e.g., Group By, Sum, Min, or Max). For example, consider a detail table with a granularity of days, a precomputed view defined on that table with a granularity of months, and the detail table and the precomputed view both contain the sum of dollars. Queries relating to how many dollars were generated for a year may be answered by the month table, but not answered directly—a further aggregation must be computed to answer the queries. Each time the precomputed view is accessed to answer a query about the sum of dollars for a year, the NON_EXACT_MATCH_COUNT column is incremented by one. If the answer to the query is not an exact match of what is in the precomputed view, including when additional aggregation is performed and when a join to another table occurs, the column is incremented.

The RBW_PRECOMPVIEW_UTILIZATION table describes the view utilization information for the materialized views for a specific base table. For example, the database administrator can query the Utilization table to see how well the existing views on the Sales table are utilized:

```
Select name, reference_count, rollup_count
   From rbw_precompview_utilization
   Where detail_table_name = 'SALES';
```

The scope of the above analysis can further be constrained to a date range:

```
Select name, reference_count, rollup_count
    From rbw_precompview_utilization
    Where detail_table_name = 'SALES';
        start_date = date('1996-01-01') and end-date = date('1996-03-30');
```

If there are no constraints on the {start_date, end_date} columns, the scope of the analysis will be all the existing AdvisorLog files. As an another example, the database administrator can ask to see the view utilization, view benefits, and view size for the existing views on sales:

```
Select name, reference_count, benefit, size
    From rbw_precompview_utilization
    Where detail_table_name = 'SALES';
``` b. Defining an Analysis Space

Figure 13:
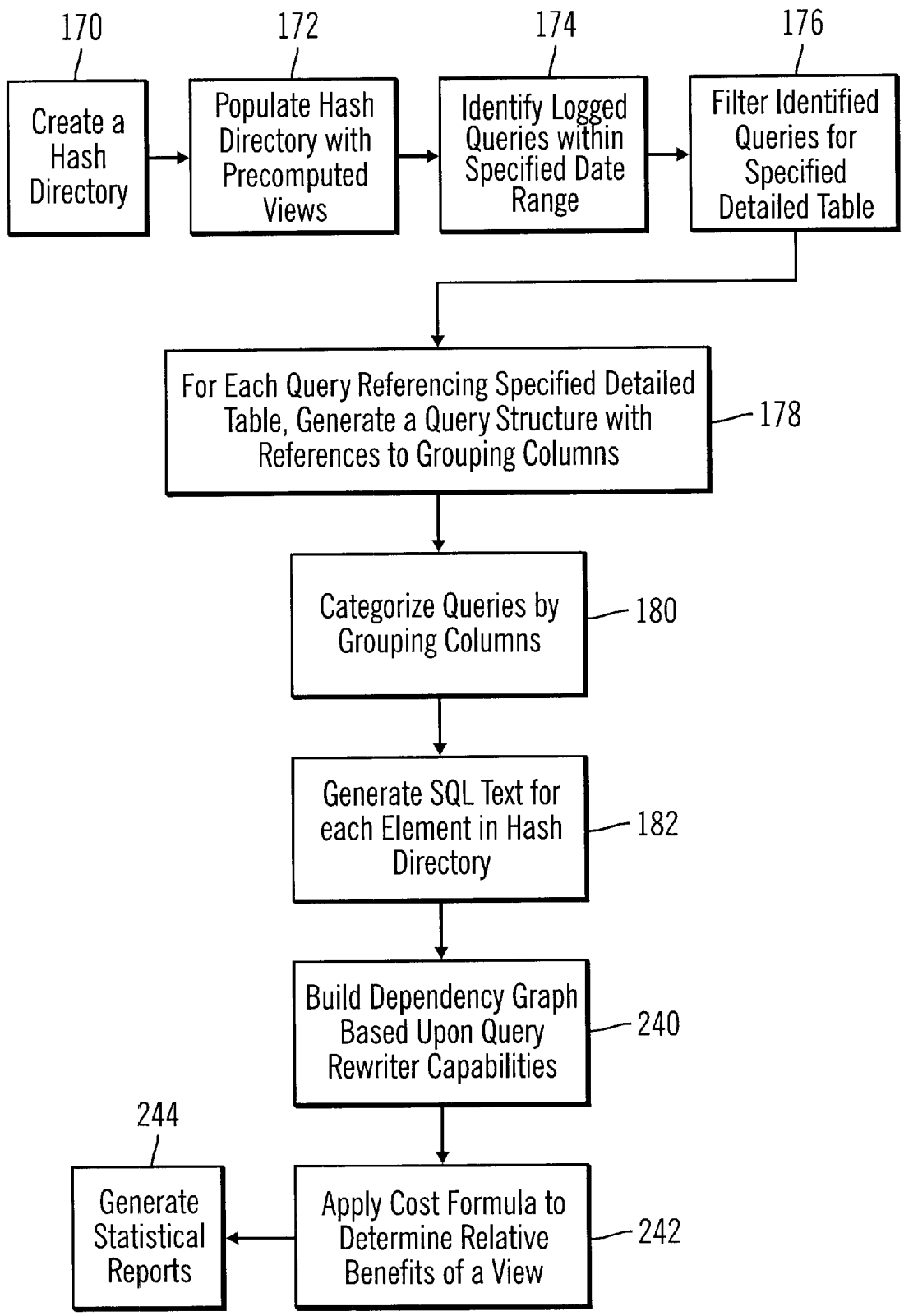

Referring to FIG. 13, in one embodiment, the Advisor defines an analysis space as follows. At start-up the Advisor creates a Hash-Directory (step 170). The Advisor populates the Hash-Directory with existing precomputed views (step 172). The Advisor identifies all of the logged queries stored in log 64 that have a date within a specified date range (step 174). The Advisor filters the identified queries for the queries that reference the specified detail table (step 176). For each query referencing the specified detail table, the Advisor generates a query structure that includes references to grouping columns (step 178).

The Advisor categorizes the queries by their grouping columns so that each query will be hashed to its proper slot based upon its grouping columns (step 180). Upon collision, the Advisor will add the element to the Hash-Directory if its Grouping columns are different than the rest; otherwise, if the aggregate expression is different, the Advisor will add the aggregate expression to a list of aggregate expressions. For each candidate view, the Advisor keeps track of the aggregate elapsed time and the number of references to the view. At this point, the Advisor generates SQL text for each element in the Hash-Directory (step 182).

c. Imposing a Structure on the Analysis Space

Referring back to FIG. 13, after a view definition has been generated for each element in the Hash-Directory, the Advisor builds a dependency graph based upon the capabilities of the Rewriter (step 240). Two elements of the graph are related by a directed edge if one element's view definition can be rewritten in terms of the second element's view definition. The graph may be completed by generating one or more parent nodes of the candidate views. Parent nodes are nodes of finer granularity as compared to their child node or nodes. To expand the graph, one pass may be made from the leaf nodes to the root node to create parent nodes by combining two or more nodes. The parent node may include the combined grouping columns. For each level, except for the leaf nodes, there are generated nodes which were created through combination of two or more children, and actual nodes which were created from processing the log file. In one embodiment, two nodes are combined to produce a parent if, and only if, one of the nodes was an actual node; this minimizes the number of nodes in the graph. The root node of a graph represents the finest granularity of data (i.e., the fact table).

d. Performing a Cost-Benefit Analysis

After the dependency graph has been built, the Advisor applies a cost formula to the dependency graph to determine the benefits of each view relative to the other views that may be used to answer the same query (step 242; FIG. 13). The cost model assumes as its input a directed graph with space cost (i.e., the number of rows) associated with each view. As used herein, the dependency relationship between two elements (views) in the graph is denoted by $\leq$. For elements a, b of a graph, b is an ancestor of a, if and only if $a \leq b$. If $C(v)$ is the cost of view v, the benefit, $B(v, S)$, of view v relative to a set S of nodes in the dependency graph is defined by:

$$B(v,S) = \Sigma_{w \leq v} B_w$$

where, for each $w \leq v$, $B_w = C(v) - C(u)$ if $C(v) < C(u)$ for view u, which is the least cost in S such that $w \leq u$; otherwise $B_w = 0$. Thus, the benefit of v is computed by considering how it can improve the cost of evaluating views, including itself. For each view w that v covers, the cost of evaluating w using v is compared with the cost of using whatever view from S offered the cheapest way to evaluate w. If the cost of v is less than the cost of the competitor, then the difference represents part of the benefit of selecting v as a materialized view. The total benefit, $B(v,S)$, is the sum over all views w of the benefit of using v to evaluate w.

The set S of dependency graph nodes, which are to be used in a benefit calculation, is generated using the following method:

```
S = {root fact table node}
for (i = 0; i < number of nodes in dependency graph; i++) {
    select a view "v" in graph such that v is not in S and such that
    B(v, S) is maximized;
    S = S union {node representing "v"}
}
```

The views in a graph are unlikely to have the same probability of being requested in a query. A probability representing the frequency with which the view is queried is therefore associated with each view. The probability of view v is the total number of references to v over the total number of references to all the views in the graph. To normalize the benefit metric of a view v to be measured in terms of the total number of rows processed, the probability, $Pr_v$, is redefined as the total number of references to v (as opposed to the total number of references to v over the total number of references to all the views in the graph). Under this formulation, the benefit, $B(v, S)$, of view v relative to a set S of views is given by:

$$B(v,S) = \Sigma_{x \leq v} Pr_w \times B_w$$

The size of a precomputed view is readily determined from the number of rows in the view. Because the sizes of candidate views are not known, the Advisor must estimate the size of these views. In one embodiment, the Advisor estimates the size of a candidate view by running the cost model on a statistically representative but small subset of the detail data. The database administrator may define the subset of the detail data (as a view) on which the cost model is run. In this way, the size of a candidate view is estimated by actually materializing the view. The database administrator may also supply the Advisor with a sample of the detail table represented by a view on that table.

In another embodiment, sampling and analytical methods are used to compute the sizes of different views from a materialization of the largest element in the graph (i.e., the view that groups by the largest attribute in each dimension). In a third embodiment, the Advisor dynamically calculates the potential view size at query execution time. In another embodiment, the database administrator supplies the Advisor with a number of distinct values for each attribute of a dimension and all possible or interesting correlation values; from this information the Advisor estimates the size of each view in the graph.

After the cost formula has been applied to the dependency graph, the Advisor generates statistical reports that may be queried by the database administrator (step 244).

4. Interpreting the Results of Queries on Advisor System Tables

There is always a cost-benefit trade-off in creating precomputed views. The cost is in disk space, time to create, time to load, and time to administer. The benefit is better query performance. Users always favor faster performance. The database administrator should evaluate this trade-off and decide which precomputed views should be created and which should be removed. Queries on the Advisor system tables assist the database administrator in making these decisions.

The BENEFIT columns in the RBW_PRECOMPVIEW_UTILIZATION and RBW_PRECOMPVIEW_CANDIDATES tables provide a measure of the relative benefit for the views of a given Advisor run. The numbers in the BENEFIT column are measures of the number of rows that would not have to be processed with the corresponding precomputed views.

The SIZE columns in the RBW_PRECOMPVIEW_UTILIZATION and RBW_PRECOMPVIEW_CANDIDATES tables specify the number of rows in the precomputed view or the candidate view. In general, views with a smaller number of rows are less expensive than views with a greater number of rows. The REDUCTION_FACTOR columns provide the ratio of the view size with respect to the detail table. Both the size and the reduction factor of a view should be considered in evaluating the cost and benefit of a particular view.

The REFERENCE_COUNT column specifies how many times a precomputed view was used (RBW_PRECOMPVIEW_UTILIZATION table) or could have been used (RBW_PRECOMPVIEW_CANDIDATES table). In general, if this number is small, the associated view it not particularly useful for the database.

In sum, a good number in any particular column by itself generally is not a compelling reason to create or remove a view. Instead, all of the numbers associated with a view should be considered together when assessing the value of that view. In addition, the results for a particular view should considered in the context of all of the views for a given detail table.

Other embodiments are within the scope of the claims. For example, many of the above embodiments were described in the context of aggregate queries and precomputed aggregate queries. The invention applies to other implementations as well. Thus, a precomputed view containing no aggregation may be defined and created by precomputed view processing system 20, and may be used by the Rewriter and the Advisor.

In another embodiment, the database administrator may limit the Advisor's inquiry to views that were referenced more than a certain number of times or to views with an aggregate execution time (i.e., sum of each query's aggregate block elapse time referencing that view) that is greater than a threshold amount of time. Alternatively, the dependency graph may be limited to a minimum (but acceptable) number of nodes.

Still other embodiments are within the scope of the claims.

What is claimed is:

1. A system for answering queries sent to a database server, comprising:
   a query processing system integrated into the database server and configured to respond to queries; and
   a precomputed view processing system integrated with the query processing system, wherein the precomputed view processing system includes an advisor that provides advice on a precomputation strategy by providing advice on which potential views should be precomputed and which existing views should be dropped and wherein integration of the precomputed view processing system with the query processing system integrated into the database server comprises utilizing one or more capabilities of the query processing system located at the database server.

2. The system of claim 1, wherein the advisor is configured to analyze the effectiveness of a precomputation strategy.

3. The system of claim 1, wherein the advisor is configured to determine a precomputation strategy.

4. The system of claim 3, wherein the precomputation strategy is determined based on query history.

5. The system of claim 1, wherein the advisor is configured to generate a report on a precomputation strategy.

6. The system of claim 5, wherein the report is generated in the form of a relational table.

7. The system of claim 5, wherein the report is generated in response to a query.

8. The system of claims 7, wherein the query is expressed in SQL.

9. The system of claim 5, wherein the generated report includes precomputed view utilization.

10. The system of claim 1, wherein the advisor is configured to analyze the effectiveness of potential precomputed views.

11. The system of claim 1, wherein the advisor is configured to analyze the effectiveness of existing precomputed views.

12. The system of claim 1, wherein the precomputed view processing system includes a query rewriter configured to rewrite queries submitted against the database using precomputed views.

13. The system of claim 12, wherein the advisor utilizes the query rewriter.

14. The system of claim 1, wherein the query processing system utilizes meta data.

15. The system of claim 14, wherein the meta data include functional dependencies.

16. The system of claim 1, wherein the advisor is configured to define an analysis space consisting of a subset of all possible precomputed views for the database.

17. The system of claim 16, wherein the analysis space is based on query history.

18. The system of claim 1, wherein the advisor is configured to generate a candidate view.

19. The system of claim 18, wherein the candidate view is generated in response to a query that was not rewritten to use a precomputed view.

20. The system of claim 1, wherein the queries contain aggregation.

21. The system of claim 1, wherein the advisor is configured to log queries that are rewritten to access data in precomputed views, candidate views, and information about correlated subqueries.

22. The system of claim 1, wherein the one or more capabilities of the query processing system include a SQL interface.

23. The system of claim 1, wherein integration of the precomputed view processing system with the query processing system comprises storing precomputed view metadata in system catalogs.

24. A system for answering queries sent to a database server, comprising:
 a query processing system integrated into the database server and configured to respond to queries; and
 a precomputed view processing system integrated with the query processing system, wherein the precomputed view processing system includes an advisor that provides advice on a precomputation strategy, wherein the advisor is configured to generate a report on a precomputation strategy, and wherein the generated report includes a measure of the benefit of an existing or potential precomputed view relative to other existing or potential precomputed views.

25. A system for answering queries sent to a database server, comprising:
 a query processing system integrated into the database server and configured to respond to queries; and
 a precomputed view processing system integrated with the query processing system, wherein the precomputed view processing system includes an advisor that provides advice on a precomputation strategy, wherein the advisor is configured to generate a report on a precomputation strategy, and wherein the generated report includes a measure of costs associated with existing or potential precomputed views.

26. A system for answering queries sent to a database server, comprising:
 a query processing system integrated into the database server and configured to respond to queries; and
 a precomputed view processing system integrated with the query processing system, wherein the precomputed view processing system includes an advisor that provides advice on a precomputation strategy, wherein the advisor generates a candidate view, and wherein the candidate view is generated in response to a query that was rewritten to use a first precomputed view and wherein the generated candidate view is different from the first precomputed view.

27. A system for answering queries sent to a database server, comprising:
 a query processing system integrated into the database server and configured to respond to queries; and
 a precomputed view processing system integrated with the query processing system, wherein the precomputed view processing system includes an advisor that provides advice on a precomputation strategy, wherein integration of the precomputed view processing system with the query processing system integrated into the database server comprises utilizing one or more capabilities of the query processing system located at the database server, and wherein the one or more capabilities of the query processing system include estimating the size of a potential precomputed view.

28. A system for answering queries sent to a database server, comprising:
 a query processing system integrated into the database server and configured to respond to queries; and
 a precomputed view processing system integrated with the query processing system, wherein the precomputed view processing system includes a rewriter configured to rewrite queries using one or more precomputed views utilizing functional dependencies and wherein integration of the precomputed view processing system with the query processing system integrated into the database server comprises utilizing one or more capabilities of the query processing system located at the database server.

29. The system of claim 28, wherein the rewriter is configured to use a cost-based analysis to choose among potential rewrites.

30. A system for answering queries sent to a database server, comprising:
 a query processing system integrated into the database server and configured to respond to queries; and
 a precomputed view processing system integrated with the query processing system, wherein the precomputed view processing system enables creating and dropping precomputed views, enables rewriting of queries using precomputed views, and provides advice on a precomputation strategy by providing advice on which potential views should be precomputed and which existing views should be dropped and wherein integration of the precomputed view processing system with the query processing system integrated into the database server comprises utilizing one or more capabilities of the query processing system located at the database server.

31. A method for answering queries sent to a database server, comprising:
 responding to queries using a query processing system integrated into the database server; and
 processing precomputed views using a precomputed view processing system integrated with the query processing system, wherein the precomputed view processing system includes an advisor that provides advice on a precomputation strategy by providing advice on which potential views should be precomputed and which existing views should be dropped and wherein integration of the precomputed view processing system with the query processing system integrated into the database server comprises utilizing one or more capabilities of the query processing system located at the database server.

32. The method of claim 31, wherein the advisor analyzes the effectiveness of a precomputation strategy.

33. The method of claim 31, wherein the advisor determines a precomputation strategy.

34. The method of claim 33, wherein the precomputation strategy is determined based on query history.

35. The method of claim 31, wherein the advisor generates a report on a precomputation strategy.

36. The method of claim 35, wherein the report is generated in the form of a relational table.

37. The method of claim 35, wherein the report is generated in response to a query.

38. The method of claim 37, wherein the query is expressed in SQL.

39. The method of claim 35, wherein the generated report includes precomputed view utilization.

40. The method of claim 31, wherein the advisor analyzes the effectiveness of potential precomputed views.

41. The method of claim 31, wherein the advisor analyzes the effectiveness of existing precomputed views.

42. The method of claim 31, wherein the precomputed view processing system includes a query rewriter that rewrites queries submitted against the database using precomputed views.

43. The method of claim 42, wherein the advisor utilizes the query rewriter.

44. The method of claim 31, wherein the query processing system utilizes meta data.

45. The method of claim 44, wherein the meta data include functional dependencies.

46. The method of claim 31, wherein the advisor defines an analysis space consisting of a subset of all possible precomputed views for the database.

47. The method of claim 46, wherein the analysis space is based on query history.

48. The method of claim 31, wherein the advisor generates a candidate view.

49. The method of claim 48, wherein the candidate view is generated in response to a query that was not rewritten to use a precomputed view.

50. The method of claim 31, wherein the queries contain aggregation.

51. The method of claim 31, wherein the advisor logs queries that are rewritten to access data in precomputed views, candidate views, and information about correlated subqueries.

52. The method of claim 31, wherein the one or more capabilities of the query processing system include a SQL interface.

53. The method of claim 31, wherein integration of the precomputed view processing system with the query processing system comprises storing precomputed view metadata in system catalogs.

54. A method for answering queries sent to a database server, comprising:
    responding to queries using a query processing system integrated into the database server; and
    processing precomputed views using a precomputed view processing system integrated with the query processing system, wherein the precomputed view processing system includes an advisor that provides advice on a precomputation strategy, wherein the advisor generates a report on a precomputation strategy, and wherein the generated report includes a measure of the benefit of an existing or potential precomputed view relative to other existing or potential precomputed views.

55. A method for answering queries sent to a database server, comprising:
    responding to queries using a query processing system integrated into the database server; and
    processing precomputed views using a precomputed view processing system integrated with the query processing system, wherein the precomputed view processing system includes an advisor that provides advice on a precomputation strategy, wherein the advisor generates a report on a precomputation strategy, and wherein the generated report includes a measure of costs associated with existing or potential precomputed views.

56. A method for answering queries sent to a database server, comprising:
    responding to queries using a query processing system integrated into the database server; and
    processing precomputed views using a precomputed view processing system integrated with the query processing system, wherein the precomputed view processing system includes an advisor that provides advice on a precomputation strategy, wherein the advisor generates a candidate view, and wherein the candidate view is generated in response to a query that was rewritten to use a first precomputed view and wherein the generated candidate view is different from the first precomputed view.

57. A method for answering queries sent to a database server, comprising:
    responding to queries using a query processing system integrated into the database server; and
    processing precomputed views using a precomputed view processing system integrated with the query processing system, wherein the precomputed view processing system includes an advisor that provides advice on a precomputation strategy, wherein integration of the precomputed view processing system with the query processing system integrated into the database server comprises utilizing one or more capabilities of the query processing system located at the database server, and wherein the one or more capabilities of the query processing system include estimating the size of a potential precomputed view.

58. A method for answering queries sent to a database server, comprising:
    responding to queries using a query processing system integrated into the database server; and
    processing precomputed views using a precomputed view processing system integrated with the query processing system, wherein the precomputed view processing system includes a rewriter configured to rewrite queries using one or more precomputed views utilizing functional dependencies and wherein integration of the precomputed view processing system with the query processing system integrated into the database server comprises utilizing one or more capabilities of the query processing system located at the database server.

59. The method of claim 58, wherein the rewriter uses a cost-based analysis to choose among potential rewrites.

60. A method for answering queries sent to a database server, comprising:
    responding to the queries using a query processing system integrated into the database server; and
    processing precomputed views using a precomputed view processing system integrated with the query processing system, wherein the precomputed view processing system enables creating and dropping precomputed views, enables rewriting of queries using precomputed views, and provides advice on a precomputation strategy by providing advice on which potential views should be precomputed and which existing views should be dropped and wherein integration of the precomputed view processing system with the query processing system integrated into the database server comprises utilizing one or more capabilities of the query processing system located at the database server.

61. A computer program product, tangibly stored on a computer-readable medium, for answering queries sent to a database server, comprising instructions operable to cause a programmable processor to:
    respond to the queries using a query processing system integrated into the database server to respond to queries; and
    process precomputed views using a precomputed view processing system integrated with the query processing system, wherein the precomputed view processing system includes an advisor that provides advice on a precomputation strategy by providing advice on which potential views should be precomputed and which existing views should be dropped and wherein integration of the precomputed view processing system with the query processing system integrated into the database server comprises utilizing one or more capabilities of the query processing system located at the database server.

62. The computer program product of claim 61, further comprising instructions at the advisor operable to cause a programmable processor to analyze the effectiveness of a precomputation strategy.

63. The computer program product of claim 61, further comprising instructions at the advisor operable to cause a programmable processor to determine a precomputation strategy.

64. The computer program product of claim 63, wherein the precomputation strategy is determined based on query history.

65. The computer program product of claim 61, further comprising instructions at the advisor operable to cause a programmable processor to generate a report on a precomputation strategy.

66. The computer program product of claim 65, wherein the report is generated in the form of a relational table.

67. The computer program product of claim 65, wherein the report is generated in response to a query.

68. The computer program product of claim 67, wherein the query is expressed in SQL.

69. The computer program product of claim 65, wherein the generated report includes precomputed view utilization.

70. The computer program product of claim 61, further comprising instructions at the advisor operable to cause a programmable processor to analyze the effectiveness of potential precomputed views.

71. The computer program product of claim 61, further comprising instructions at the advisor operable to cause a programmable processor to analyze the effectiveness of existing precomputed views.

72. The computer program product of claim 61, wherein the precomputed view processing system includes a query rewriter for rewriting queries submitted against the database using precomputed views.

73. The computer program product of claim 72, further comprising instructions at the advisor operable to cause a programmable processor to utilize the query rewriter.

74. The computer program product of claim 61, wherein the query processing system utilizes meta data.

75. The computer program product of claim 74, wherein the meta data include functional dependencies.

76. The computer program product of claim 61, further comprising instructions at the advisor operable to cause a programmable processor to define an analysis space consisting of a subset of all possible precomputed views for the database.

77. The computer program product of claim 76, wherein the analysis space is based on query history.

78. The computer program product of claim 61, further comprising instructions at the advisor operable to cause a programmable processor to generate a candidate view.

79. The computer program product of claim 78, wherein the candidate view is generated in response to a query that was not rewritten to use a precomputed view.

80. The computer program product of claim 61, wherein the queries contain aggregation.

81. The computer program product of claim 61, further comprising instructions at the advisor operable to cause a programmable processor to log queries that are rewritten to access data in precomputed views, candidate views, and information about correlated subqueries.

82. The computer program product of claim 61, wherein the one or more capabilities of the query processing system include a SQL interface.

83. The computer program product of claim 61, wherein integration of the precomputed view processing system with the query processing system comprises storing precomputed view metadata in system catalogs.

84. A computer program product, tangibly stored on a computer-readable medium, for answering queries sent to a database server, comprising instructions operable to cause a programmable processor to:

respond to the queries using a query processing system integrated into the database server to respond to queries; and process precomputed views using a precomputed view processing system integrated with the query processing system, wherein the precomputed view processing system includes a rewriter configured to rewrite queries using one or more precomputed views utilizing functional dependencies and wherein integration of the precomputed view processing system with the query processing system integrated into the database server comprises utilizing one or more capabilities of the query processing system located at the database server.

85. The computer program product of claim 84, further comprising instructions at the rewriter operable to cause a programmable processor to use a cost-based analysis to choose among potential rewrites.

86. A computer program product, tangibly stored on a computer-readable medium, for answering queries sent to a database server, comprising instructions operable to cause a programmable processor to:

respond to the queries using a query processing system integrated into the database server to respond to queries; and process precomputed views using a precomputed view processing system integrated with the query processing system, wherein the precomputed view processing system includes an advisor that provides advice on a precomputation strategy;

generate a report on a precomputation strategy, wherein the generated report includes a measure of the benefit of an existing or potential precomputed view relative to other existing or potential precomputed views.

87. A computer program product, tangibly stored on a computer-readable medium, for answering queries sent to a database server, comprising instructions operable to cause a programmable processor to:

respond to the queries using a query processing system integrated into the database server to respond to queries; and process precomputed views using a precomputed view processing system integrated with the query processing system, wherein the precomputed view processing system includes an advisor that provides advice on a precomputation strategy;

generate a report on a precomputation strategy, wherein the generated report includes a measure of costs associated with existing or potential precomputed views.

88. A computer program product, tangibly stored on a computer-readable medium, for answering queries sent to a database server, comprising instructions operable to cause a programmable processor to:

respond to the queries using a query processing system integrated into the database server to respond to queries;

process precomputed views using a precomputed view processing system integrated with the query processing system, wherein the precomputed view processing system includes an advisor that provides advice on a precomputation strategy; and generate a candidate view, wherein the candidate view is generated in response to a query that was rewritten to use a first precomputed view and wherein the generated candidate view is different from the first precomputed view.

89. A computer program product, tangibly stored on a computer-readable medium, for answering queries sent to a database server, comprising instructions operable to cause a programmable processor to:

respond to the queries using a query processing system integrated into the database server to respond to queries; and process precomputed views using a precomputed view processing system integrated with the query processing system, wherein the precomputed view processing system includes an advisor that provides advice on a precomputation strategy, wherein integration of the precomputed view processing system with the query processing system integrated into the database server comprises utilizing one or more capabilities of the query processing system located at the database server, and wherein the one or more capabilities of the query processing system include estimating the size of a potential precomputed view.

90. A computer program product, tangibly stored on a computer-readable medium, for answering queries sent to a database server, comprising instructions operable to cause a programmable processor to:

respond to the queries using a query processing system integrated into the database server to respond to queries; and process precomputed views using a precomputed view processing system integrated with the query processing system, wherein the precomputed view processing system enables creating and dropping precomputed views, enables rewriting of queries using precomputed views, and provides advice on a precomputation strategy by providing advice on which potential views should be precomputed and which existing views should be dropped and wherein integration of the precomputed view processing system with the query processing system integrated into the database server comprises utilizing one or more capabilities of the query processing system located at the database server.

* * * * *

UNITED STATES PATENT AND TRADEMARK OFFICE
CERTIFICATE OF CORRECTION

PATENT NO.    : 6,594,653
DATED         : July 15, 2003
INVENTOR(S)   : Latha S. Colby et al.

It is certified that error appears in the above-identified patent and that said Letters Patent is hereby corrected as shown below:

<u>Column 26,</u>
Line 34, please delete "claims" and insert -- claim. --

Signed and Sealed this

Eighth Day of June, 2004

JON W. DUDAS
*Acting Director of the United States Patent and Trademark Office*